US009628330B2

(12) United States Patent
Hattori

(10) Patent No.: US 9,628,330 B2
(45) Date of Patent: Apr. 18, 2017

(54) INFORMATION PROVIDING DEVICE, INFORMATION PROVIDING METHOD, AND INFORMATION PROVIDING SYSTEM

(71) Applicant: Shingo Hattori, Tokyo (JP)

(72) Inventor: Shingo Hattori, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 642 days.

(21) Appl. No.: 13/945,064

(22) Filed: Jul. 18, 2013

(65) Prior Publication Data

US 2014/0025792 A1 Jan. 23, 2014

(30) Foreign Application Priority Data

Jul. 20, 2012 (JP) ................... 2012-162021
Jul. 9, 2013 (JP) ................... 2013-143275

(51) Int. Cl.
  *H04L 12/24* (2006.01)
  *H04W 4/02* (2009.01)
  *H04W 4/00* (2009.01)
  *H04L 29/08* (2006.01)

(52) U.S. Cl.
  CPC ...... *H04L 41/0813* (2013.01); *H04L 41/0816* (2013.01); *H04W 4/001* (2013.01); *H04W 4/02* (2013.01); *H04L 67/18* (2013.01)

(58) Field of Classification Search
  CPC .................................................. H04L 41/0813
  USPC ........................................................ 709/221
  See application file for complete search history.

(56) References Cited

U.S. PATENT DOCUMENTS

| 7,242,491 B2 * | 7/2007 | Nakayasu ............. G06F 3/1204 358/1.15 |
| 7,948,437 B2 | 5/2011 | Torimoto et al. |
| 8,280,398 B2 | 10/2012 | Ishii et al. |
| 2003/0142016 A1 * | 7/2003 | Pickup ................... G01S 1/047 342/387 |
| 2004/0125401 A1 * | 7/2004 | Earl ................... H04N 1/00188 358/1.15 |

(Continued)

FOREIGN PATENT DOCUMENTS

| JP | 2006-048229 | 2/2006 |
| JP | 4296302 | 7/2009 |

(Continued)

OTHER PUBLICATIONS

Japan Aerospace Exploration Agency (Feb. 28, 2012), "Quasi-Zenith Satellite System Navigation Service—Interface Specification for QZSS V1.4".

*Primary Examiner* — Backhean Tiv
(74) *Attorney, Agent, or Firm* — Harness, Dickey & Pierce, P.L.C.

(57) ABSTRACT

An information providing device which communicates with a communication terminal and an information processing device accepting a request of information processing from the communication terminal includes an obtaining unit obtaining positional information about the communication terminal; a determining unit determining that the information processing device is using the positional information; and a transmitting unit transmitting to the communication terminal configuration information required for the communication terminal to allow the information processing device to perform the information processing.

16 Claims, 26 Drawing Sheets

(56) References Cited

U.S. PATENT DOCUMENTS

| | | | | |
|---|---|---|---|---|
| 2005/0128519 | A1* | 6/2005 | Yamauchi | H04N 1/00209 358/1.15 |
| 2007/0177161 | A1* | 8/2007 | Ishii | G01S 1/70 356/614 |
| 2007/0198102 | A1* | 8/2007 | Umehara | G06F 3/1204 700/32 |
| 2007/0204045 | A1* | 8/2007 | Shima | H04N 1/00233 709/226 |
| 2007/0234354 | A1* | 10/2007 | Hattori | G06F 3/1204 717/177 |
| 2010/0020349 | A1* | 1/2010 | Carroll | G06F 3/121 358/1.15 |
| 2011/0050493 | A1* | 3/2011 | Torimoto | G01S 19/11 342/357.29 |
| 2011/0122437 | A1 | 5/2011 | Shimohira | |
| 2011/0222110 | A1* | 9/2011 | Asafuku | G06F 3/1204 358/1.15 |
| 2012/0072376 | A1* | 3/2012 | Akiyama | G06Q 30/0283 705/400 |
| 2012/0140285 | A1* | 6/2012 | Kamath | G06F 3/1204 358/1.15 |
| 2012/0250074 | A1* | 10/2012 | Kamppari | G06F 3/1204 358/1.15 |
| 2013/0308165 | A1* | 11/2013 | Venkatesh | G06F 3/1205 358/1.15 |

FOREIGN PATENT DOCUMENTS

| | | |
|---|---|---|
| JP | 2009-225287 | 10/2009 |
| JP | 2011-108132 | 6/2011 |
| WO | 2005/086375 | 9/2005 |

\* cited by examiner

FIG.8A

| LATITUDE | LONGITUDE | FLOOR NUMBER | RECEIVED DATE AND TIME |
|---|---|---|---|
| : | : | : | : |
| 35.66635 | 139.76555 | 4 | 2012/6/18 10:05:00 |

[002673abcd01] ～110

FIG.8B

| LATITUDE | LONGITUDE | FLOOR NUMBER | RECEIVED DATE AND TIME |
|---|---|---|---|
| : | : | : | : |
| 35.66635 | 139.76555 | 4 | 2012/6/18 10:01:00 |

[002673abcd02] ～120

FIG.8C

| LATITUDE | LONGITUDE | FLOOR NUMBER | RECEIVED DATE AND TIME |
|---|---|---|---|
| : | : | : | : |
| 35.66630 | 139.76555 | 4 | 2012/6/18 09:59:00 |

[001002abcd03] ～122

FIG.8D

| LATITUDE | LONGITUDE | FLOOR NUMBER | RECEIVED DATE AND TIME |
|---|---|---|---|
| : | : | : | : |
| 35.66635 | 139.76560 | 4 | 2012/6/18 10:02:00 |

[002003abcd04] ～124

FIG.8E

| LATITUDE | LONGITUDE | FLOOR NUMBER | RECEIVED DATE AND TIME |
|---|---|---|---|
| : | : | : | : |
| 35.66630 | 139.76560 | 4 | 2012/6/18 09:58:00 |

[005001abcd05] ～126

FIG.9

| DEVICE IDENTIFICATION INFORMATION | DEVICE NAME | WIRELESS TERMINAL IDENTIFICATION INFORMATION |
|---|---|---|
| #001 | LAPTOP PC 01 | 002673abcd01 |
| #002 | BLACK AND WHITE PRINTER 01 | 002673abcd02 |
| #003 | PROJECTOR A1 | 001002abcd03 |
| #004 | LIQUID CRYSTAL DISPLAY 3 | 002003abcd04 |
| #005 | COLOR MFP 01 | 005001abcd05 |
| .. | .. | .. |

FIG.10

| REGION NAME | EAST END | WEST END | SOUTH END | NORTH END | FLOOR NUMBER |
|---|---|---|---|---|---|
| A4-S SIDE | 139.76570 | 139.76520 | 35.66630 | 35.66660 | 4 |
| A4-N SIDE | 139.76570 | 139.76520 | 35.66670 | 35.66700 | 4 |
| A5-S SIDE | 139.76570 | 139.76520 | 35.66630 | 35.66660 | 5 |
| .. | .. | .. | .. | .. | .. |

FIG.11

| DEVICE IDENTIFICATION INFORMATION | (1) PAPER SIZE | (2) PRINT COLORS | (3) DISPLAY RESOLUTION | (4) DISPLAY COLORS |
|---|---|---|---|---|
| #002 | A4<br>B5 | BLACK AND WHITE | — | — |
| #003 | — | — | 800×600<br>1024×768 | 32 BITS |
| #004 | — | — | 800×600<br>1024×768<br>1280×1024 | 32 BITS |
| #005 | A4<br>A3<br>B4<br>B5 | BLACK AND WHITE<br>COLOR | — | — |
| .. | .. | .. | .. | .. |

| DEVICE IDENTIFICATION INFORMATION | CONNECTION INFORMATION | DRIVER INFORMATION | FUNCTIONAL SETTING INFORMATION |
|---|---|---|---|
| #002 | fcmfp01.company.com | mono_printer.exe | mono_printer_config2.rst |
| #003 | – | remote_projector.zip | profile.txt |
| #004 | – | widi_installer.exe | – |
| #005 | mprint01.company.com | color_mfp.exe | color_mfp_config1.rst |
| ‥ | ‥ | ‥ | ‥ |

| FLOOR NUMBER: 9 BITS | LATITUDE: 21 BITS | LONGITUDE: 21 BITS | BUILDING NUMBER: 8 BITS |
|---|---|---|---|

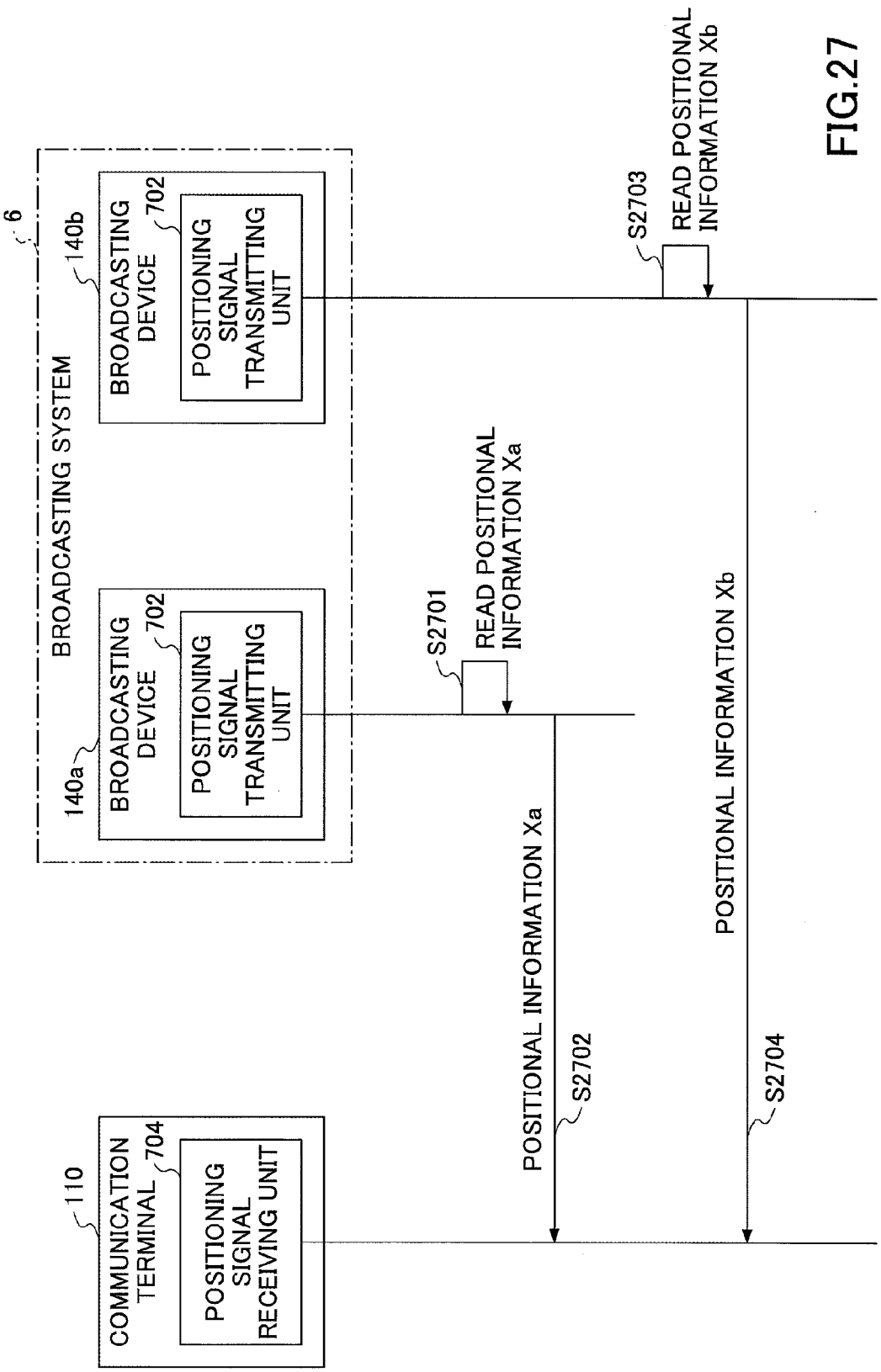

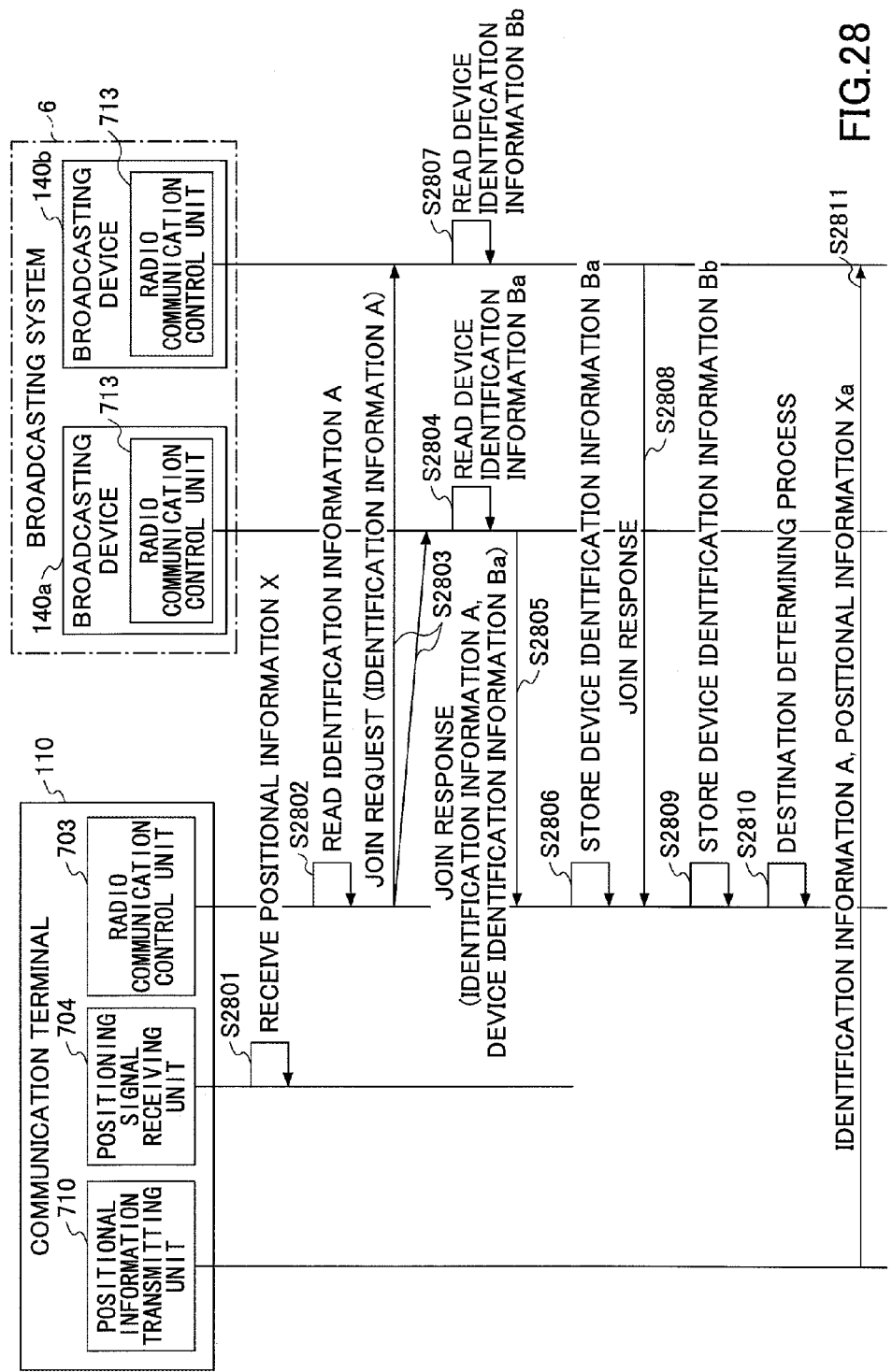

INFORMATION PROVIDING DEVICE, INFORMATION PROVIDING METHOD, AND INFORMATION PROVIDING SYSTEM

CROSS-REFERENCE TO RELATED APPLICATIONS

The present application is based upon and claims the benefit of priority of Japanese Patent Application No. 2012-162021 filed on Jul. 20, 2012, and Japanese Patent Application No. 2013-143275 filed on Jul. 9, 2013, the entire contents of which are incorporated herein by reference.

BACKGROUND OF THE INVENTION

1. Field of the Invention

An aspect of this disclosure is related to an information providing device, information providing method, and information providing system.

2. Description of the Related Art

The number of users is increasing, who bring a smart device such as a laptop, a smartphone or a tablet (i.e. a mobile communication terminal) and do his/her job by connecting the smart device with an internal or external network. An information processing device such as a printer, a projector, and a display, etc., is installed for an internal or external office space. The user may use the information processing device through his/her mobile communication terminal via the network.

For the purpose of allowing the information processing devices to execute image output processing, the user needs to configure the above mentioned communication terminal for each of the information processing devices particularly. Also, some kinds of information processing devices force the user to install dedicated software such as a driver (typically, a printer driver) allowing the communication device to control the information processing device. The user needs to know configuration information required to allow the information processing device to execute the image output processing and driver information.

However, the user has to spend energy to configure the information processing device or to install the driver every time when the user changes a location to work. In addition, it is difficult for the user, who is not used to operating the communication terminal or does not have enough knowledge of a configuration of the communication terminal for the information processing device, to change the configuration every time when the user changes the location to work. Furthermore, even the skilled user may not know how to configure the communication terminal or install the driver for the information processing device which will be installed at a location where the user has not yet visited.

Any conventional technology does not teach a method allowing the information processing device which is convenient for the user to output images.

In particular, Patent Document 1 discloses a technology of performing connection configuration of a communication terminal by using a network address obtained from an information processing device via a configuration network. However, when the communication terminal connects with the information processing device for the first time, a workload of the user is not decreased because the user has to install a driver of the information processing device.

Patent Document 2 discloses a method of specifying an image forming device based on an IP address of a communication terminal and transmitting a printer driver associated with the image forming device to the communication terminal. However, in case that an external IP address is used, the method fails to determine the image forming device. As a result, user need to obtain the driver in his own.

Patent Documents 3, 4 and Non-patent Document 1 disclose a method of obtaining positional information about an information processing device installed indoors.

PATENT DOCUMENT

[Patent Document 1] Japanese Laid-open Patent Publication No. 2009-225287
[Patent Document 2] Japanese Laid-open Patent Publication No. 2006-048229
[Patent Document 3] International Publication 2005/086375
[Patent Document 4] Japanese Patent No. 4296302

Non-Patent Document

[Non-patent Document 1] "Quasi-Zenith Satellite System Navigation Service Interface Specification for QZSS (IS-QZSS) V1.4", Japan Aerospace Exploration Agency An embodiment of this invention aims to provide an information providing device which may provide information related to configurations required to use an information processing device efficiently.

SUMMARY OF THE INVENTION

In an aspect of this disclosure, there is provided an information providing device which communicates with a communication terminal and an information processing device accepting a request of execution of information processing from the communication terminal. The information providing device includes an information obtaining unit configured to obtain positional information about the communication terminal; a determining unit configured to determine that the information processing device is using the positional information obtained by the information obtaining unit; and a transmitting unit configured to transmit to the communication terminal configuration information required for the communication terminal to allow the information processing device determined by the determining unit to perform the information processing.

According to another embodiment of this invention, there is provided an information providing method performed in an information providing device which communicates with a communication terminal and an information processing device accepting a request of execution of information processing from the communication terminal. The information providing method includes obtaining positional information about the communication terminal; determining that the information processing device is using the positional information obtained in the obtaining step; and transmitting to the communication terminal configuration information required for the communication terminal to allow the information processing device determined in the determining step to perform the information processing.

According to another embodiment of this invention, there is provided an information providing system including a communication terminal; and an information providing device communicating with the communication terminal and an information processing device accepting a request of execution of information processing from the communication terminal. The information providing device includes an information obtaining unit configured to obtain positional information about the communication terminal, a determining unit configured to determine that the information processing device is using the positional information obtained by the information obtaining unit, and a transmitting unit configured to transmit configuration information required for the communication terminal to allow the information processing device determined by the determining unit to perform the information processing to the communication terminal. The communication terminal includes a configuration unit configured to perform configuration using the configuration information transmitted by the transmitting unit so that the communication terminal allows the information processing device to perform the information processing.

BRIEF DESCRIPTION OF THE DRAWINGS

Other objects and further features of embodiments may become apparent from the following detailed description when read in conjunction with the accompanying drawings, in which:

FIG. 8A is a table illustrating a management table for positional information storing positional information about a communication terminal and a wireless terminal according to an embodiment;

FIG. 8B is a table illustrating a management table for positional information storing positional information about a communication terminal and a wireless terminal according to an embodiment;

FIG. 8C is a table illustrating a management table for positional information storing positional information about a communication terminal and a wireless terminal according to an embodiment;

FIG. 8D is a table illustrating a management table for positional information storing positional information about a communication terminal and a wireless terminal according to an embodiment;

FIG. 8E is a table illustrating a management table for positional information storing positional information about a communication terminal and a wireless terminal according to an embodiment;

FIG. 9 is a table illustrating a management table for device information storing device information about a communication terminal and an information processing device according to an embodiment;

FIG. 10 is a table illustrating a region information table associating positional information with region information according to an embodiment;

FIG. 11 is a table illustrating a functional information table storing functional information about an information processing device according to an embodiment;

FIG. 12 is a table illustrating a configuration information table storing configuration information about each information processing device according to an embodiment;

FIG. 25 is a table illustrating exemplary positional information broadcast by a broadcasting device;

FIG. 27 is a sequence chart illustrating an exemplary process of broadcasting positional information; and FIG. 28 is a sequence chart illustrating a process of determining positional information to be used by a communication terminal and determining a broadcasting device to which the positional information is to be transmitted.

DESCRIPTION OF THE PREFERRED EMBODIMENTS

Figure 1:
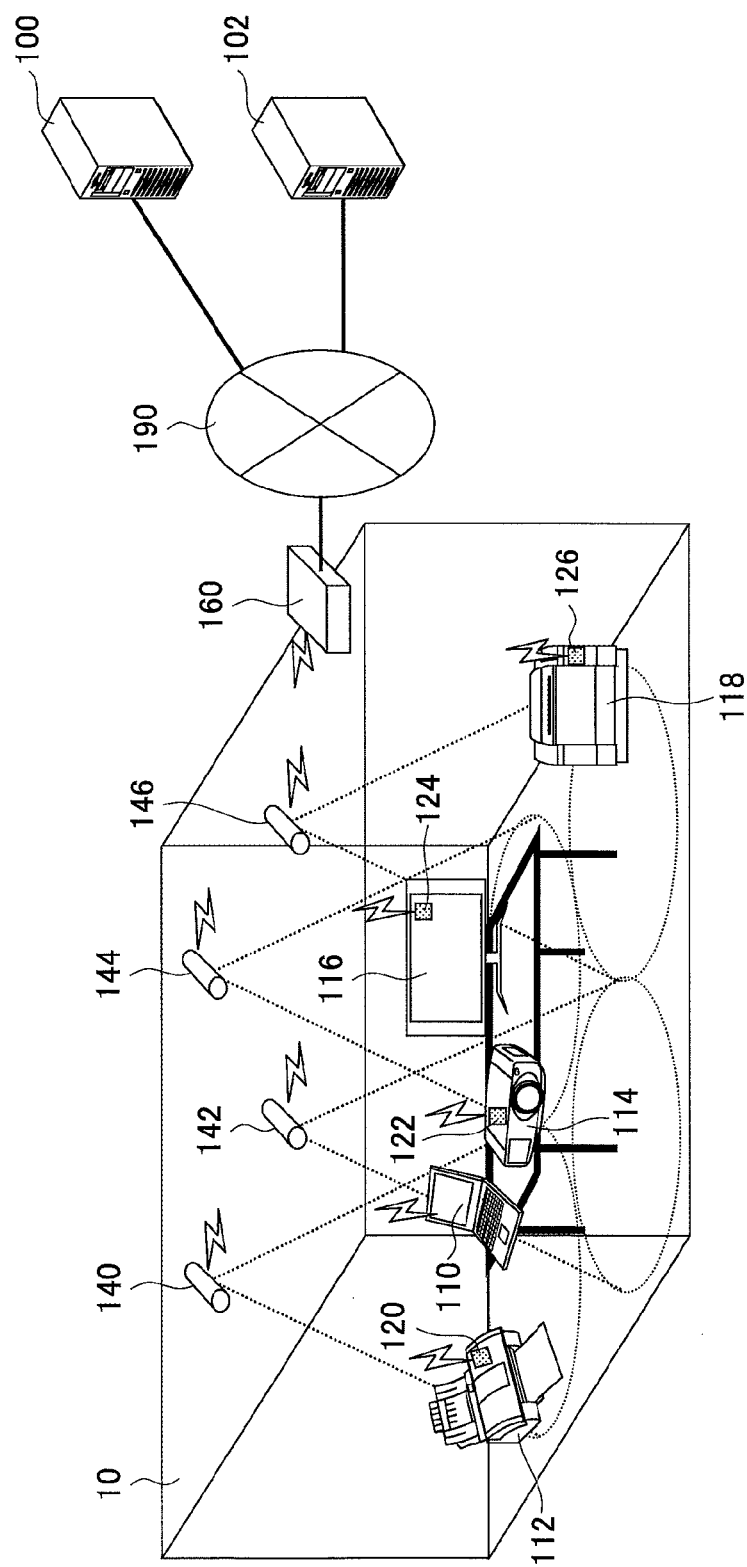
FIG. 1 is a drawing illustrating an overview of an information providing system according to an embodiment.

The invention will be described herein with reference to illustrative embodiments. Those skilled in the art will recognize that many alternative embodiments can be accomplished using the teachings of the present invention and that the invention is not limited to the embodiments illustrated for explanatory purposes.

It is to be noted that, in the explanation of the drawings, the same components are given the same reference numerals, and explanations are not repeated.

1. System Overview
2. Hardware Structure
2.1 Information Providing Device
2.2 Communication Terminal
2.3 Broadcasting Device
2.4 Gateway
3. Functional Block
3.1 Network Establishing Function
3.2 Positional Information Management Function
3.3 Configuration Information Providing Function
4. Process Flow
4.1 Process to Establish a Network
4.2 Process to Provide Positional Information
4.3 Process to Provide Configuration Information
4.3.1 First Example
4.3.2 Second Example
4.3.3 Third Example (1. System Overview)

FIG. 1 shows an overview of a system including an information providing device according to an embodiment of this invention. FIG. 1 shows a region 10 (e.g. a compartment, a meeting room, a booth, a building, a wing or the like). The region 10 has a region name such as "A4-S SIDE". In the "A4-S SIDE", a communication terminal 110 which is used by a user such as a laptop is placed along with information processing devices 112-118 such as a black and white printer, a projector, a display, or a color MFP. The communication terminal 110 may access the information processing devices 112-118 via a dedicated cable or a network 190 such as LAN.

For example, the communication terminal 110 of a user who visits "A4-S SIDE" for the first time and tries to start to work does not have configuration information (e.g. connection information, driver information, or functional setting information) which is required to use the information processing devices 112-118. Before ordering the black and white printer to perform an image output function, the communication terminal 110 accesses the information providing device 110 which is connected to the network 190 and asks for configuration information about the information processing devices placed in the same region with the communication terminal 110. The information providing device 100 transmits configuration information about the black and white printer 112, which is placed on the same region with the communication terminal 110 and whose function meets requirements specified by the user (e.g. A3 printing support, color printing support, or the like). The communication terminal 110 may use the configuration information and transmit a request for the black and white printer 112 to perform image output processing.

Here, a method executed by the information providing device 100 is explained for determining the information processing devices which are placed in the same region with the communication terminal 110. As shown in FIG. 1, wireless terminals 120, 122, 124 and 126 are attached to the respective information processing devices. The communication terminal 110 used by the user and the wireless terminals 120-126 may receive positioning signals transmitted (broadcasted) by broadcasting devices 140, 142, 144, and 146 installed on the ceiling of the region 10. For example, the positioning signal is constructed according to the IMES (Indoor Messaging System) standard. The positioning signal includes positional information indicating a latitude, longitude, a floor number, a building number or the like where the corresponding broadcasting device is installed. FIG. 25 shows a table illustrating the positional information broadcast by the broadcasting devices. The positioning signal may be broadcast with any radio technology (e.g. infrared light or ultrasound wave).

In FIG. 1, a reachable range of the positioning signal transmitted by each of the broadcasting devices 140-146 is shown with dashed line. As shown in FIG. 1, the positioning signal transmitted by the broadcasting device 140 is received by the communication terminal 110 and the wireless terminal 120 which is attached to the information processing device 112. In addition, the positioning signal transmitted by the broadcasting device 142 is received by the wireless terminal 122 which is attached to the information processing device 114. Furthermore, the positioning signal transmitted by the broadcasting device 144 is received by the wireless terminal 124 which is attached to the information processing device 116. The positioning signal transmitted by the broadcasting device 146 is received by the wireless terminal 126 which is attached to the information processing device 118.

The communication terminal 110 and the wireless terminals 120-126 obtain the positional information with the positioning signal, and then the communication terminal 110 and the wireless terminals 120-126 transmit the positional information and identification information about themselves to a positional information management system 102 which is connected to a short range wireless communications network 180 (the network 180 is explained in detail later). The information providing device 100 determines the information processing devices 112-118 placed in the same region with the communication terminal 110 by using the positional information about the communication terminal 110 and the wireless terminals 120-126 stored in the position management system 102. Here, each of the wireless terminals 120-126 is associated with a respective one of the information processing devices 112-118 in advance. Thus, the position of each of the wireless terminals 120-126 indicates the position of the corresponding information processing device. A relationship between a region and the positional information is defined by a table shown in FIG. 10.

A process is explained for transmitting the identification information and the positional information preformed by the communication terminal 110 and the wireless terminals 120-126 with the short range wireless communications network 180. The short range wireless communications network 180 is a personal area network (PAN) conforming to a short range wireless communications standard such as ZigBee or Bluetooth. Any other wireless communication technology may be used. The short range wireless communications network 180 is formed by the communication terminal 110, the wireless terminals 120-126, the broadcasting devices 140-146 and the gateway 160.

The communication terminal 110 and the wireless terminals 120-126, which have received the positional information from the broadcasting devices 140-146, transmit the identification information about themselves and the received positional information to the broadcasting devices 140-146 via the wireless communications such as ZigBee. As mentioned above, the broadcasting devices 140-146 which form the network 180 relay the information transmitted by the communication terminal 110 and the wireless terminals 120-126 to the gateway 160. The information is finally conveyed to the positional information management system 102 via the network 190 such as a LAN.

As stated above, the broadcasting devices 140-146 continually transmit (broadcast) the positioning signal, which includes the positional information which indicates the position where the broadcasting devices are installed, into a predetermined space. The positional information includes information about latitude, longitude, a floor number and a building number. The positioning signal may be constructed conforming to the IMES standard. In addition, the broadcasting devices 140-146 provide a relay function (a routing function) to construct the network 180. For example, when ZigBee is used for the short range wireless communications method, each of the broadcasting devices 140-146 operates as a ZigBee router.

The gateway 160 connects the network 180 with the network 190, and relays data transmitted from the network 180 to the network 190. For example, when the network 180 is the short range wireless communications network conforming to ZigBee and the network 190 is a LAN based on IEEE 802.3 standard, the gateway 160 transforms communication protocols between both of the networks. Also, the gateway 160 may manage configuration of the network 180.

Figure 2:
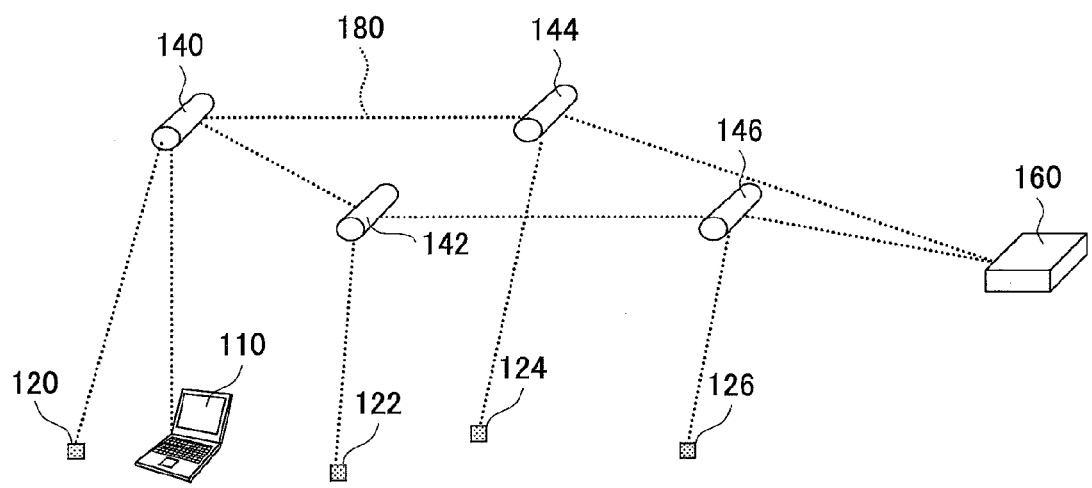
FIG. 2 is a drawing illustrating an exemplary configuration of a network used in to an embodiment.

FIG. 2 shows some elements extracted from FIG. 1 in order to explain structure of the network 180. As shown in FIG. 2, the communication terminal 110 and the wireless terminals 120-126 are connected to an end point of the network 180. When ZigBee is used for the short range wireless communications, the communication terminal 110 and the wireless terminals 120-126 operate as ZigBee end devices (connected to a ZigBee router or a ZigBee coordinator, with no relay function). On the other hand, functions of the ZigBee coordinator (a ZigBee network has only a single ZigBee coordinator, which starts and manages the network) required to form and manage the network 180 are provided by the gateway 160.

The positional information management system 102 receives and stores the positional information and the identification information transmitted by the communication terminal 110 and the wireless terminals 120-126 via the networks 180, 190.

Figure 22:
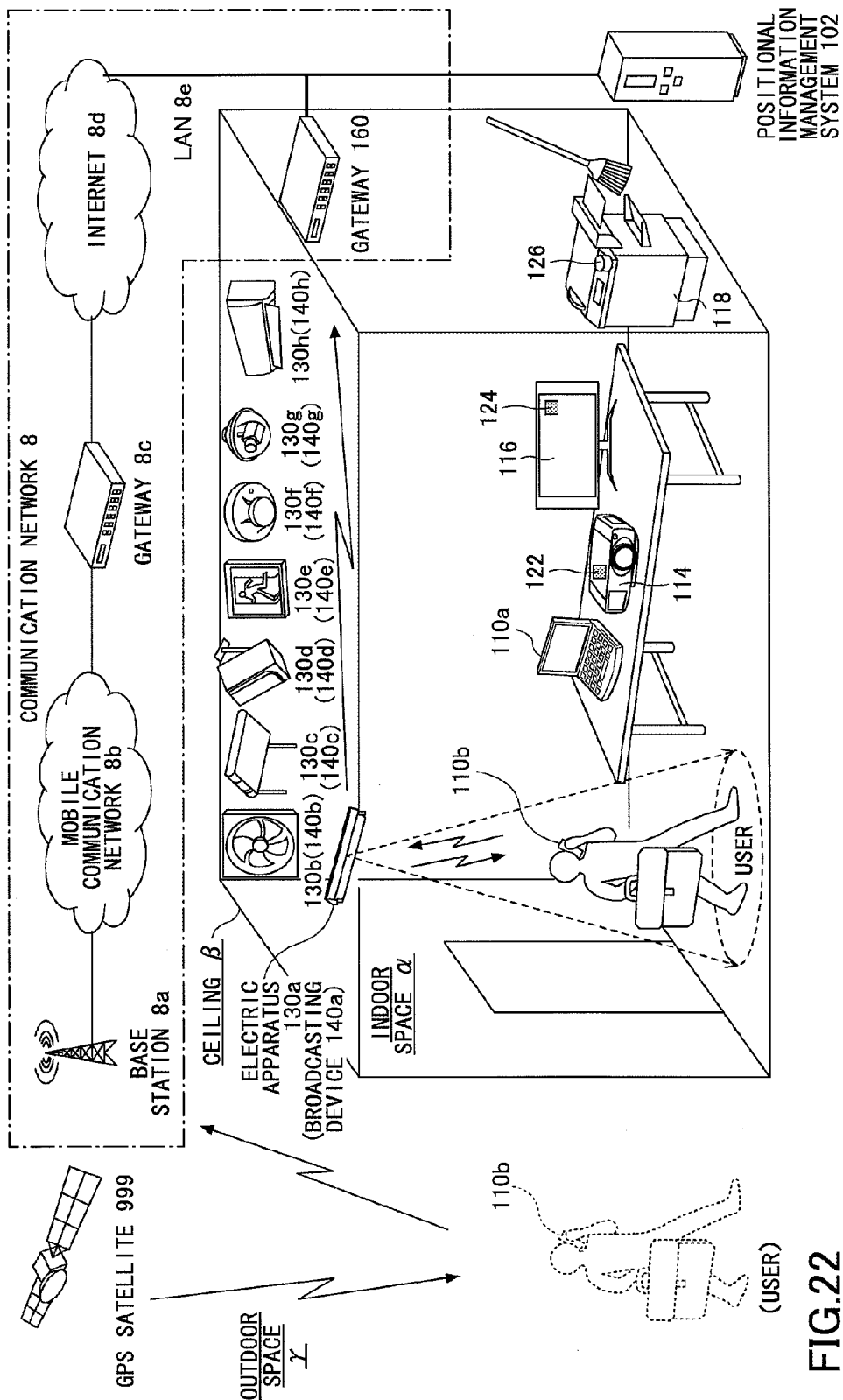
FIG. 22 is a drawing illustrating an exemplary configuration of a position management system according to an embodiment.

FIG. 22 shows some examples of devices included in the system shown in FIG. 1 and FIG. 2, which transmit and/or receive the positional information about the communication terminal 110 and the information processing devices 112-118 (i.e. the wireless terminals 120-126).

As illustrated in FIG. 22, each of the broadcasting devices 140a-140h may be included in an electric apparatus (130a-130h) mounted on a ceiling β of an indoor space a or attached to the case externally. In this specification, any of the electric apparatuses 130a-130h are collectively referred to as "electric apparatuses 130".

The electric apparatuses 130 supply power to the corresponding broadcasting devices. The electric apparatus 130a is a fluorescent-type light-emitting diode (LED) lighting apparatus. The electric apparatus 130b is a ventilation fan. The electric apparatus 130c is an access point of a wireless LAN. The electric apparatus 130d is a speaker. The electric apparatus 130e is an emergency light. The electric apparatus 130f is a fire alarm or a smoke alarm. The electric apparatus 130g is a security camera. The electric apparatus 130h is an air conditioner.

Any apparatus other than those illustrated in FIG. 22 may also be used as the electric apparatus 130 as long as it can supply power to the broadcasting device 140. For example, a lighting apparatus using a fluorescent lamp or a light bulb instead of LEDs and a security sensor for detecting intruders may also be used as the electric apparatuses 130.

The communication terminal 110 may be a cell phone 110b such as a smartphone as well as the above mentioned laptop 110a. Also, the wireless terminals 122-126 are attached to the information processing devices 114-118. The information processing device other than those illustrated in FIG. 22 may also be used as the information processing devices. Other examples of the information processing devices may include a facsimile machine, a scanner, a printer, a copier, an electronic blackboard, an air cleaner, a shredder, a vending machine, a wristwatch, a camera, a game machine, a wheelchair, and a medical device such as an endoscope.

According the above configuration, the information providing device 100 may obtain the positional information about the communication terminal 110 used by the user and the positional information about the information processing devices placed in the region, and provide the communication terminal 110 with configuration information about the information processing devices which are in the same region with the communication terminal 110. Therefore, the user may order the near information processing device to perform desired information processing without manual configuration.

As stated above, the communication terminal 110 directly receives the positioning signal from the broadcasting device and obtains the positional information. Alternatively, the communication terminal 110 may obtain the positional information via an external communication terminal attached to the communication terminal 110 in common with the other information processing devices.

(2. Hardware Structure)

Next, hardware structures of the information providing device 100, the communication terminal 110 (the wireless terminal 120), the broadcasting device 140, and the gateway 160 according to an embodiment of the invention are described with FIG. 3-FIG. 6.

(2.1 Information Providing Device)

Figure 3:
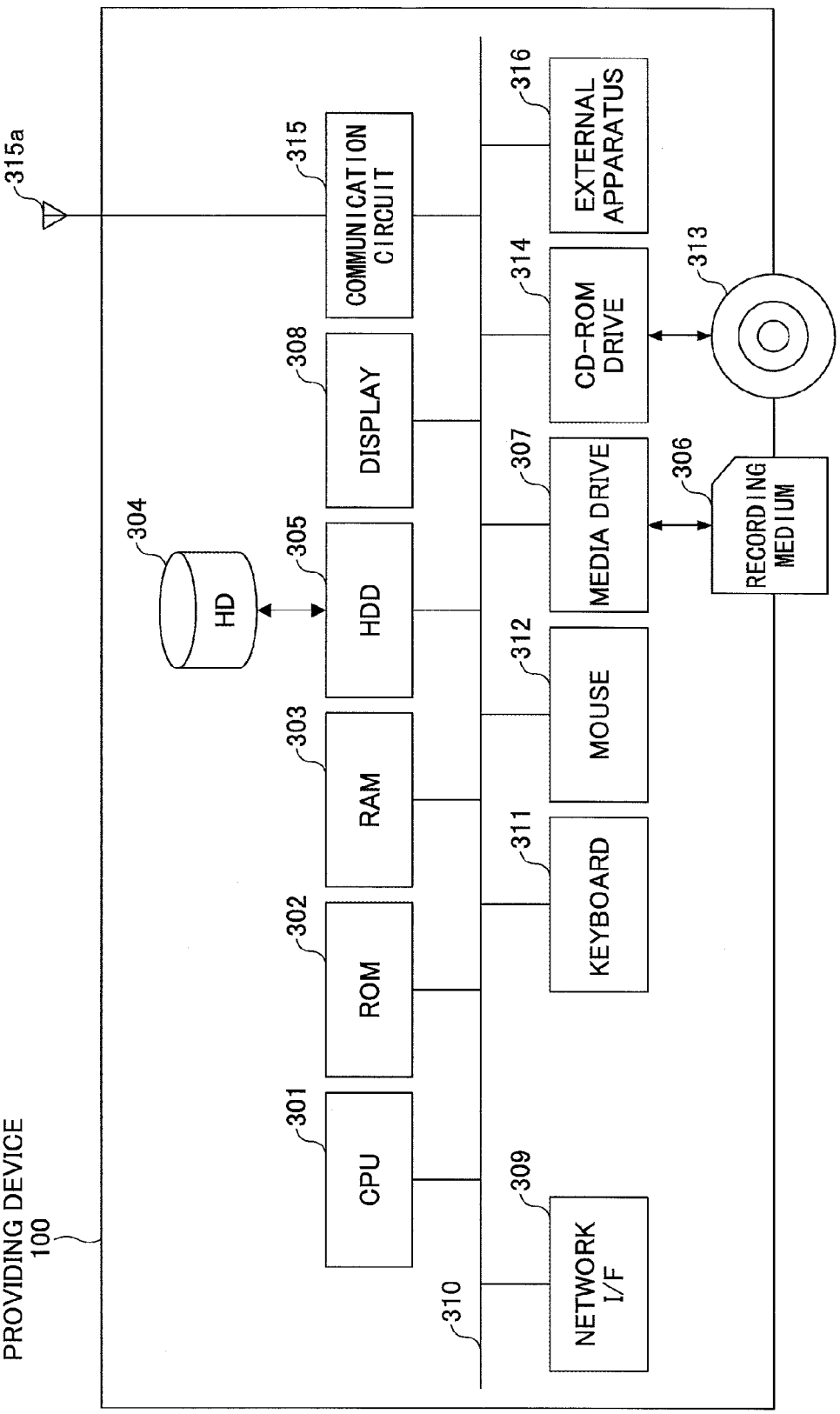
FIG. 3 is a drawing illustrating an exemplary hardware configuration of an information providing device according to an embodiment.

FIG. 3 shows a hardware configuration of the information providing device 100 according to an embodiment of the invention. The information providing device 100 may be implemented by a computer. The information providing device 100 may include a CPU 301 for controlling the operations of the entire information providing device 100; a ROM 302 storing programs such as an initial program loader (IPL) for driving the CPU 301; a RAM 303 used by the CPU 301 as a work area; a hard disk (HD) 304 storing various programs and data for the information providing device 100; a hard disk drive (HDD) 305 for reading and writing data from and to the HD 304 under the control of the CPU 301; a media drive 307 for reading and writing data from and to a recording medium 306 such as a flash memory; a display 308 for displaying information such as a cursor, menus, windows, text, and images; a network I/F 309 for data communications via the communication network; a keyboard 311 including keys for entering, for example, characters, numerals, and commands; a mouse 312 for selecting and executing commands, selecting objects, and moving a cursor; a compact disk read-only memory (CD-ROM) drive 314 for reading data from d to a CD-ROM 313 that is an example of a removable recording medium; a communication circuit 315 and an antenna 315a for radio communications; an external apparatus I/F 316 for connecting an external apparatus; and a bus line 310 such as an address bus or a data bus for electrically connecting the components of the information providing device 100. Some of the above stated components may be omitted unless function of the information providing device 100 is lost.

Based on the above stated configuration, the information providing device 100 according to the embodiment of the invention may provide the configuration information to the communication terminal 100, which is required for the information processing devices which are in the same region with the communication terminal 110.

The positional information management system 102 shown in FIG. 1 and FIG. 22 has a hardware configuration similar to the information providing device 100. Alternatively, the information providing device 100 and the positional information management system 102 may be implemented on the same hardware.

(2.2 Communication Terminal)

Figure 4:
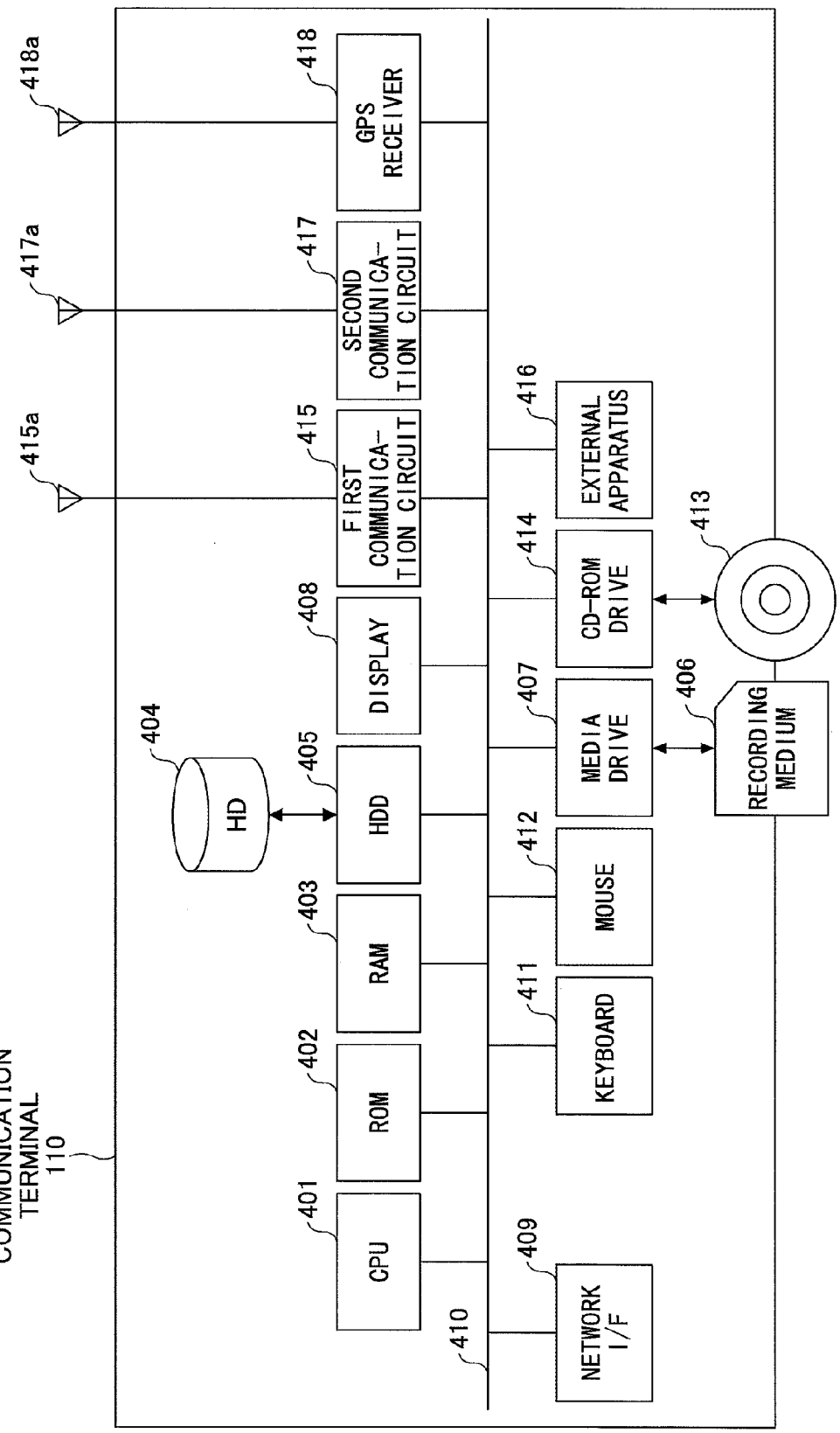
FIG. 4 is a drawing illustrating an exemplary hardware configuration of a communication terminal according to an embodiment.

FIG. 4 shows a hardware configuration of the communication terminal 110 according to an embodiment of the invention. The communication terminal 110 may be implemented by a laptop. The communication terminal 110 may include a CPU 401 for controlling the operations of the entire communication terminal 110; a ROM 402 storing programs such as an initial program loader (IPL) for driving the CPU 401; a RAM 403 used by the CPU 401 as a work area; a hard disk (HD) 404 storing various programs and data for the communication terminal 110; a hard disk drive (HDD) 405 for reading and writing data from and to the HD 404 under the control of the CPU 401; a media drive 407 for reading and writing data from and to a recording medium 406 such as a flash memory; a display 408 for displaying information such as a cursor, menus, windows, text, and images; a network I/F 409 for data communications via the communication network; a keyboard 411 including keys for entering, for example, characters, numerals, and commands; a mouse 412 for selecting and executing commands, selecting objects, and moving a cursor; a compact disk read-only memory (CD-ROM) drive 414 for reading data from a CD-ROM 413 that is an example of a removable recording medium; a first communication circuit 415 and an antenna 415a for radio communications; a second communication circuit 417 and an antenna 417a for short range wireless communications by ZigBee or the like; an external apparatus I/F 416 for connecting an external apparatus; a GPS receiver circuit 418 and an antenna 418a for receiving the positioning signal transmitted with GPS or IMES; and a bus line 410 such as an address bus or a data bus for electrically connecting the components of the communication terminal 110. Some of the above stated components may be omitted unless function of the communication terminal 110 is lost.

Based on the above stated configuration, the communication terminal 110 according to the embodiment of the invention may obtain the positional information with the positioning signal transmitted by the broadcasting device 140, and transmit the positional information to the positional information management system 102. The communication terminal 110 may receive the configuration information about the nearest information processing device from the information providing device 100 and order the information processing device 100 to perform functions of the information processing device.

The wireless terminals 120-126 attached to the information processing devices 112-118, which are explained along with FIG. 1 and FIG. 22, include the CPU 401, the ROM 402, the RAM 403, the second communication circuit 417 and the antenna 417a, the GPS receiver circuit 418 and the antenna 418a shown in FIG. 4. Thus, the wireless terminal has hardware to obtain the positional information with positioning signals transmitted by the broadcasting device 140 and transmit the positional information to the positional information management system 102 with the short range wireless communications. The wireless terminal stores required data in rewritable ROM 402. In addition, the wireless terminals 120-126 may be incorporated in a chassis of the respective information processing devices 112-118. In this case, the CPU, the RAM, and the communications circuit, etc., included in the information processing device may be used in common to implement functions of the wireless terminal.

(2.3 Broadcasting Device)

Figure 5:
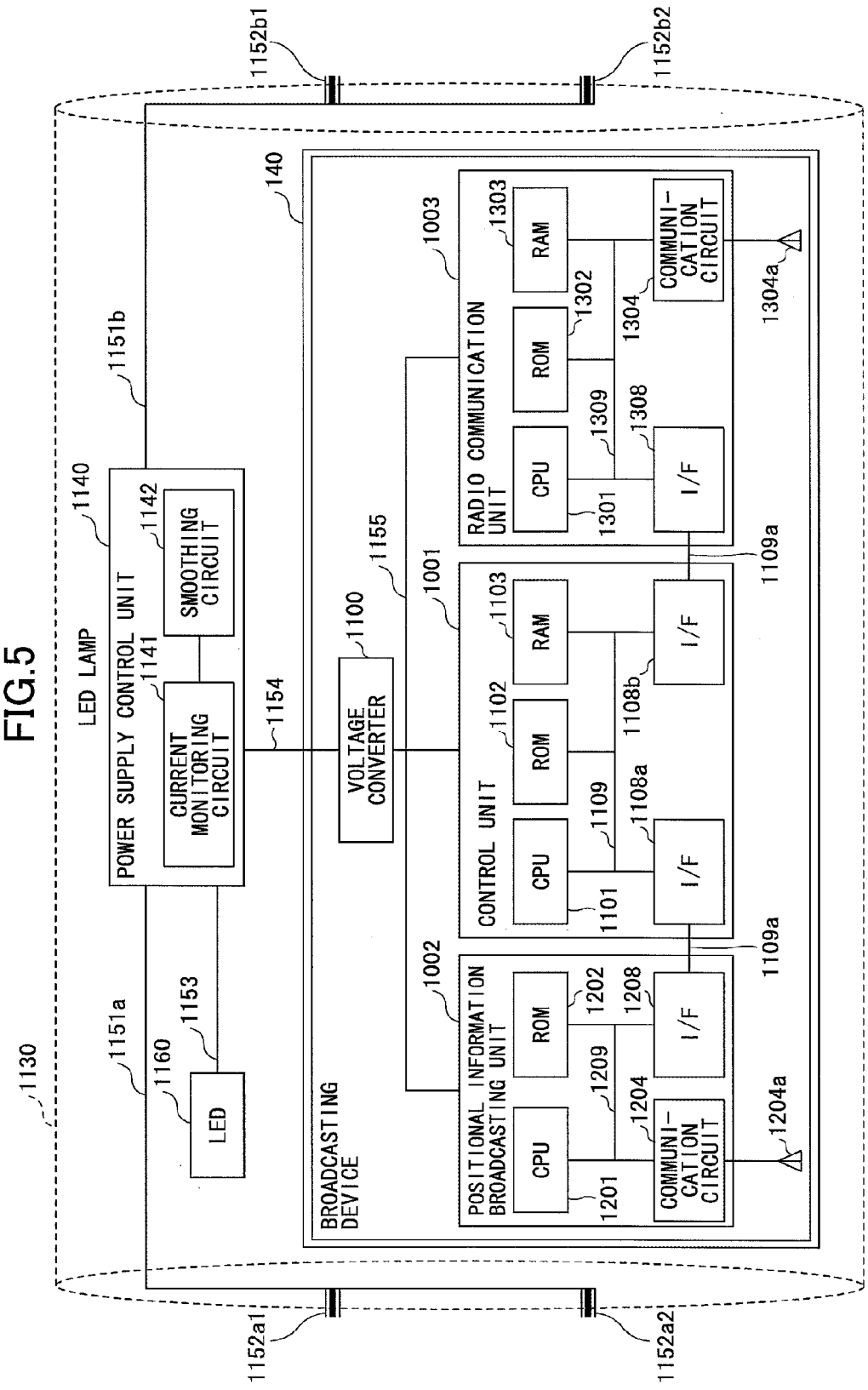
FIG. 5 is a drawing illustrating an exemplary hardware configuration of a broadcasting device according to an embodiment.
Figure 23:
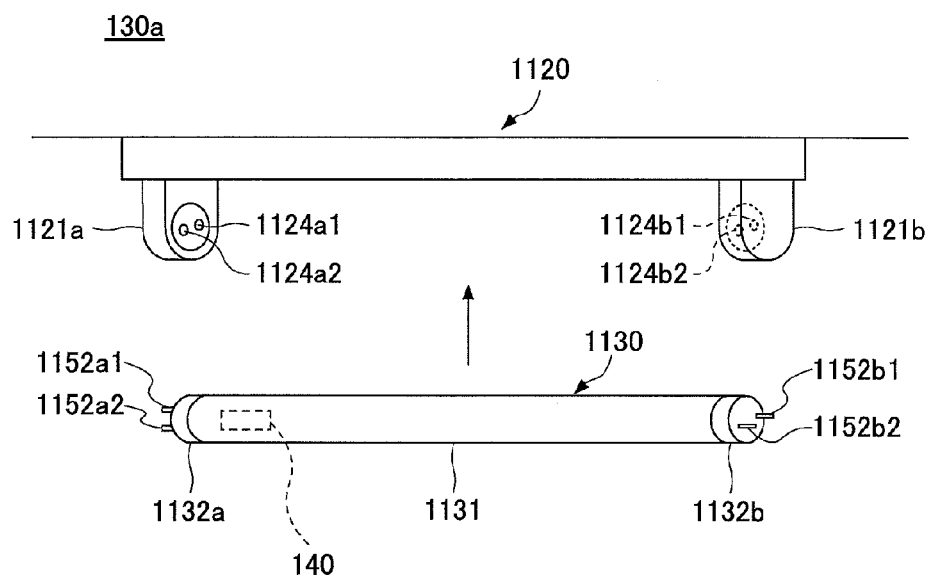
FIG. 23 is a drawing illustrating an exemplary configuration of an electric apparatus implemented as a fluorescent-type LED lighting apparatus.
Figure 24:
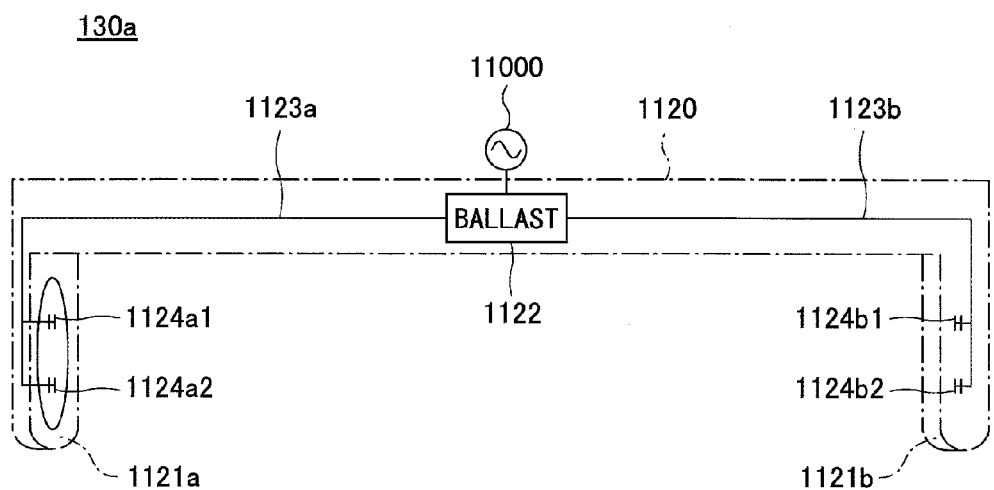
FIG. 24 is a drawing illustrating an exemplary hardware configuration of a base unit of an LED lighting apparatus.

FIG. 5, FIG. 23 and FIG. 24 show a hardware configuration of the broadcasting device 140 according to an embodiment of the invention.

FIG. 23 shows an exterior of the electric apparatus 130a which supplies power to the broadcasting device 140. In case of FIG. 23, the electric apparatus 130a is implemented as a fluorescent-type LED lighting apparatus.

As illustrated in FIG. 23, the electric apparatus 130a as the fluorescent-type LED lighting apparatus is a straight tube lamp and may include a base unit 1120 mounted on the ceiling β of the indoor space α and an LED lamp 1130 attached to the base unit 1120.

The base unit 1120 may include a socket 1121a and a socket 1121b at the corresponding ends. The socket 1121a may include power supply terminals 1124a1 and 1124a2 for supplying power to the LED lamp 1130. The socket 1121b may also include power supply terminals 1124b1 and 1124b2 for supplying power to the LED lamp 1130. With the sockets 1121a and 1121b, the base unit 1120 can supply power from a power supply 11000 to the LED lamp 1130.

The LED lamp 1130 may include a translucent cover 1131, caps 1132a and 1132b provided at the corresponding ends of the translucent cover 1131, and the broadcasting device 140 disposed in the translucent cover 1131. The translucent cover 1131 covers an internal light source and may be made of, for example, a resin material such as acrylic resin.

The cap 1132a may include terminal pins 1152a1 and 1152a2 that are to be connected to the power supply terminals 1124a1 and 1124a2 of the socket 1121a. The cap 1132b may include terminal pins 1152b1 and 1152b2 that are to be connected to the power supply terminals 1124b1 and 1124b2 of the socket 1121b. When the LED lamp 1130 is attached to the base unit 1120, power is supplied from the base unit 1120 via the power supply terminals 1124a1, 1124a2, 1124b1, and 1124b2 to the terminal pins 1152a1, 1152a2, 1152b1, and 1152b2. When power is supplied, the LED lamp 1130 emits light through the translucent cover 1131. The broadcasting device 140 is also driven by the power supplied from the base unit 1120.

Next, as an example of the electronic apparatus 130, a hardware configuration of the electric apparatus 130a (LED lighting apparatus) is described with reference to FIG. 24 and FIG. 5. FIG. 24 is a drawing illustrating an exemplary hardware configuration of the base unit 1120 of the electric apparatus 130a. FIG. 5 is a drawing illustrating an exemplary hardware configuration of the LED lamp of the electric apparatus 130a.

As illustrated in FIG. 24, the base unit 1120 may include ballast 1122, leads 1123a and 1123b, and the power supply terminals 1124a1, 1124a2, 1124b1, and 1124b2.

The ballast 1122 controls a current supplied from the external power supply 11000. The ballast 1122 and the power supply terminals 1124a1, 1124a2, 1124b1, and 1124b2 are electrically connected to each other via the leads 1123a and 1123b. With this configuration, it is possible to supply stable power from the ballast 1122 via the leads 1123a and 1123b to the power supply terminals 1124a1, 1124a2, 1124b1, and 1124b2.

As illustrated in FIG. 5, the LED lamp 1130 may include a power supply control unit 1140, leads 1151a and 1151b, the terminal pins 1152a1, 1152a2, 1152b1, and 1152b2, a lead 1153, a lead 1154, a lead 1155, a LED 1160, and the broadcasting device 140. The power supply control unit 1140 controls a current output from the power supply 11000 and may include a current monitoring circuit 1141 and a smoothing circuit 1142. The current monitoring circuit 1141 rectifies the current output from the power supply 11000. The smoothing circuit 1142 smoothes the current rectified by the current monitoring circuit 1141 and supplies power via the leads 1151a and 1151b to the terminal pins 1152a1, 1152a2, 1152b1, and 1152b2.

The power supply control unit 1140 and the terminal pins 1152a1, 1152a2, 1152b1, and 1152b2 are electrically connected to each other via the leads 1151a and 1151b. The power supply control unit 1140 and the broadcasting device 140 are electrically connected to each other via the lead 1154. Although only one LED 1160 is illustrated in FIG. 5 for brevity, the LED lamp may include plural LEDs. Except for the broadcasting device 140, a configuration of a general LED lamp may be used for the LED lamp.

Next, the broadcasting device 140 is described. The broadcasting device 140 may include a voltage converter 1100, a lead 1155, a control unit 1001, positional information broadcasting unit 1002, and a radio communication unit 1003. The voltage converter 1100 is electrically connected via the lead 1155 to the control unit 1001, the positional information broadcasting unit 1002, and the radio communication unit 1003.

The voltage converter 1100 is an electronic component that converts a voltage of power supplied from the power supply control unit 1140 into a drive voltage for driving the broadcasting device 140 and supplies the drive voltage to the control unit 1001, the positional information broadcasting unit 1002, and the radio communication unit 1003.

The control unit 1001 may include a central processing unit (CPU) 1101 for controlling the operations of the entire control unit 1001, a read-only memory (ROM) 1102 storing a basic input-output program, a random access memory (RAM) 1103 used as a work area by the CPU 1101, an interface (I/F) 1108a for sending and receiving signals to and from the positional information broadcasting unit 1002, an interface (I/F) 1108b for sending and receiving signals to and from the radio communication unit 1003, and a bus line 1109 such as an address bus or a data bus for electrically connecting the components of the control unit 1001.

The positional information broadcasting unit 1002 may include a CPU 1201 for controlling the operations of the entire positional information broadcasting unit 1002, a ROM 1202 storing a basic input-output program and positional information Xa, a communication circuit 1204 and an antenna 1204a for broadcasting the positional information Xa, an interface (I/F) 1208 for sending and receiving signals to and from the control unit 1001, and a bus line 1209 such as an address bus or a data bus for electrically connecting the components of the positional information broadcasting unit 1002.

The communication circuit 1204 broadcasts the positional information Xa from the antenna 1204a according to an indoor messaging system (IMES) that is one of indoor positioning technologies called "indoor GPS". In FIG. 1 and FIG. 22, the reachable range (broadcast range) of the positional information X is indicated by a dotted line. According to the IMES of the present embodiment, the transmission power is set such that the radius of a virtual circle on the floor of the indoor space a indicating the reachable range of the positional information X becomes about 5 m when the ceiling height of the indoor space α is about 3 m. The radius of the virtual circle may be decreased or increased by changing the setting of the transmission power.

The positional information Xa indicates the position where the electric apparatus 103a (implemented as a fluorescent-type LED lighting apparatus) is installed. The positional information Xa may include a floor number, latitude, longitude, and a building number. The latitude may be expressed by north or south latitude, and the longitude may be expressed by east or west longitude.

The radio communication unit 1003 may include a CPU 1301 for controlling the operations of the entire radio communication unit 1003, a ROM 1302 storing a basic input-output program and device identification information Ba, a RAM 1303 used as a work area by the CPU 1301, a communication circuit 1304 and an antenna 1304a for receiving the positional information Xa and the terminal identification information Aa and transmitting the received information to the gateway 160, an interface (I/F) 1308 for sending and receiving signals to and from the control unit 1001, and a bus line 1309 such as an address bus or a data bus for electrically connecting the components of the radio communication unit 1003.

The radio communication unit 1003 transmits and receives data using a 920 MHz band. Since a radio wave of the 920 MHz band has high reachability, the broadcasting device 140 can transmit data to other broadcasting devices or the gateway 160 even when pillars and walls exist between the broadcasting devices or the broadcasting device and the gateway 160.

The communication circuit 1304 may support at least the physical layer standard in the architecture model of IEEE 802.15.4 standards, and transmits and receives data via the antenna 1304a. In this case, a media access control (MAC) address may be used as the device identification information for identifying the broadcasting device 140 (the radio communication unit 1003).

Also, the communication circuit 1304 may support Zig-Bee (registered trademark) that employs the physical layer and the MAC layer in the architecture model of IEEE 802.15.4 standards. In this case, the broadcasting device 140 may use a 800 MHz band, a 900 MHz band, or a 2.4 GHz band depending on the area (e.g., Japan, USA, or Europe) where it is used, and can transmit data via another adjacent broadcasting device 140 to the gateway 160. Transmitting data via one or more other broadcasting devices 140 may be referred to as a "multi-hop communication". Although the multi-hop communication necessitates extra time for a routing process, it enables the radio communication unit 1003 to transmit data with low transmission power that is sufficient for the data to reach a nearby broadcasting device 140 and thereby makes it possible to reduce driving power of the radio communication unit 1003.

The positional information Xa may be stored by the manufacturer in a storage unit before factory shipment of the broadcasting device 140, or may be stored in the storage unit by the user when installing the electric apparatus 130a on the ceiling β after factory shipment of the broadcasting device 140. Also, the positional information Xa may be wirelessly received by the communication circuit 1304 of the radio communication unit 1003 via the gateway 160 from an external apparatus such as the positional information management system 102, and stored via the control unit 1001 in the ROM 1202 of the positional information broadcasting unit 1002.

Based on the above configuration, the broadcasting device 140 according to the embodiment of the invention may transmit the positioning signal required to allow the communication terminal 110 and the wireless terminal 112 to obtain the positional information. In addition, the broadcasting device 140 may relay communications between the communication terminal 110 or wireless terminals 120-126 and the positional information management system 102.

(2.4 Gateway)

Figure 6:
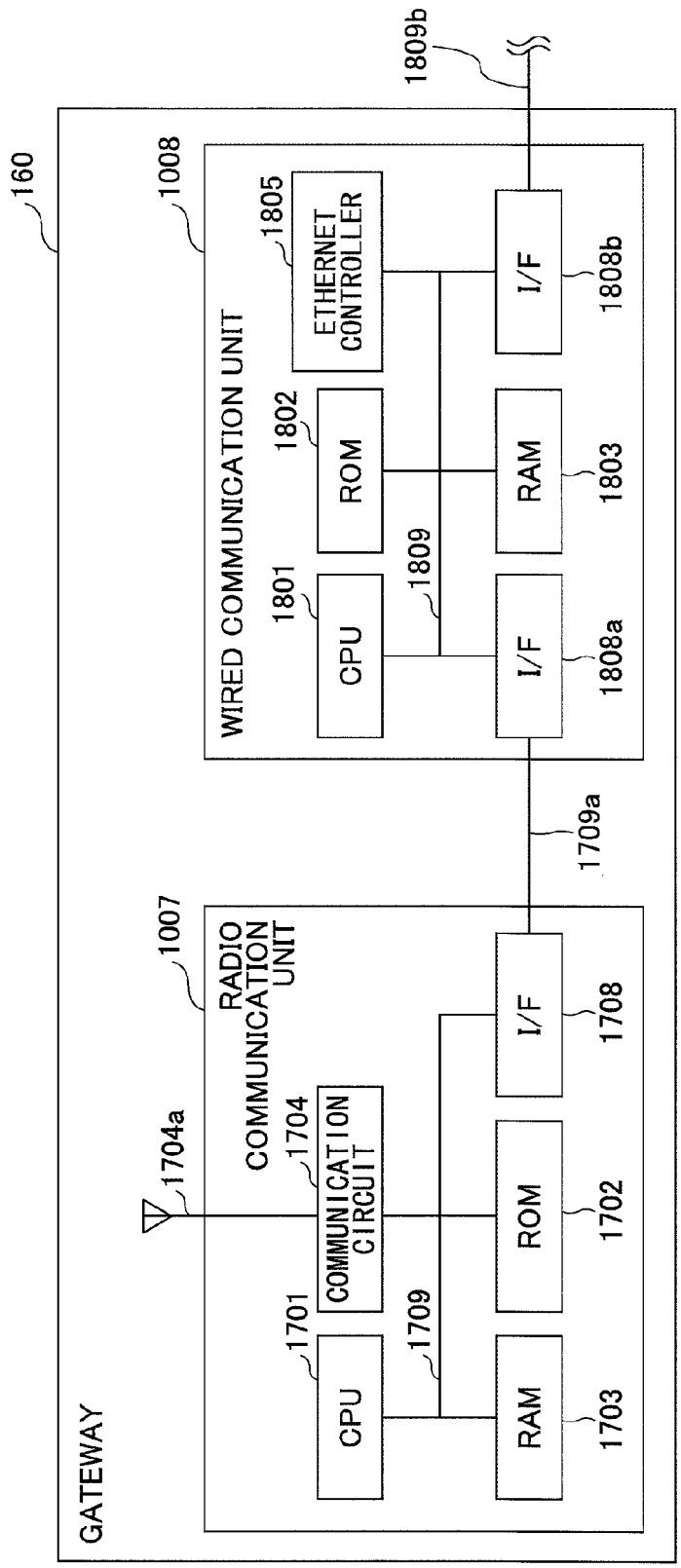
FIG. 6 is a drawing illustrating an exemplary hardware configuration of a gateway according to an embodiment.

An exemplary hardware configuration of the gateway 160 is described below with reference to FIG. 6. The gateway 160 may include a radio communication unit 1007 and a wired communication unit 1008.

The radio communication unit 1007 has substantially the same configuration as that of the radio communication unit 1003 of the broadcasting apparatus 140. The radio communication unit 1007 uses the same frequency band as the radio communication unit 1003 to send and receive data to and from the radio communication unit 1003. As in FIG. 6, the radio communication unit 1007 may include a CPU 1701 for controlling the operations of the entire radio communication unit 1007, a ROM 1702 storing a basic input-output program, a RAM 1703 used as a work area by the CPU 1701, a communication circuit 1704 and an antenna 1704*a* for transmitting the positional information X, an interface (I/F) 1708 for sending and receiving signals to and from the wired communication unit 1008, and a bus line 1709 such as an address bus or a data bus for electrically connecting the components of the radio communication unit 1007. The radio communication unit 1007 sends and receives signals via the I/F 1708 and a connector 1709*a* to and from the wired communication unit 1008. The radio communication unit 1007 may also support ZigBee.

The wired communication unit 1008 may include a CPU 1801 for controlling the operations of the entire wired communication unit 1008, a ROM 1802 storing a basic input-output program, a RAM 1803 used as a work area by the CPU 1801, an Ethernet controller 1805, an interface (I/F) 1808*a* for sending and receiving signals to and from the radio communication unit 1007, an interface (I/F) 1808*b* for sending and receiving data (signals) via a cable 1809*b* to and from the LAN, and a bus line 1809 such as an address bus or a data bus for electrically connecting the components of the wired communication unit 1008.

The CPU 1801 and the Ethernet controller 1805 convert data (or information) transmitted from the broadcasting device 140 according to a communication scheme (communication protocol) conforming to IEEE 802.15.4 into Ethernet packets for packet communications according to a communication scheme (communication protocol) conforming to IEEE 802.3.

Based on the above configuration, the gateway 160 according to the embodiment of the invention may manage the short range wireless communications network 180 formed by the broadcasting device 140, the communication terminal 110 and the wireless terminals 120-126. In addition, the gateway 160 may connect the network 180 with the network 190 mutually.

(3. Functional Block)

Figure 7:
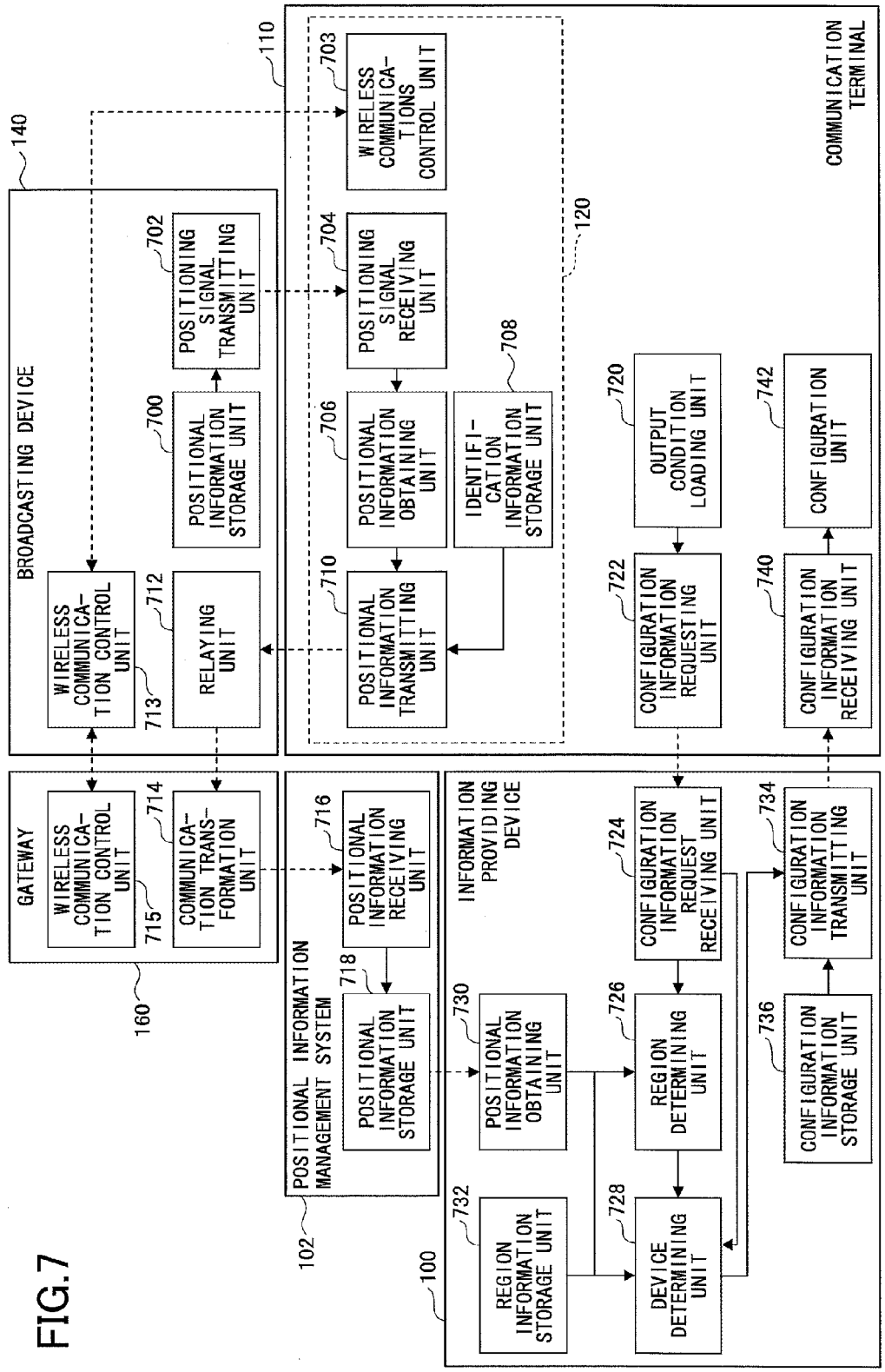
FIG. 7 is a block diagram illustrating exemplary functional configurations of an information providing device, a communication terminal, a broadcasting device, a gateway and a positional information management system according to an embodiment.

FIG. 7 is a block diagram showing a functional structure of the information providing device 100, the communication terminal 110, the wireless terminals 120-126, the broadcasting device 140, the gateway 160, and the positional information management system 102. The block diagram shown in the FIG. 7 includes some of various elements of the above devices, which are especially related to the description of the embodiment. In FIG. 7, an arrow drawn from one unit to another indicates a direction of a flow of data. In addition, the arrow with dashed line indicates a flow of data between the devices.

The following example is described based on the configuration illustrated in FIG. 1. Specifically, the communication terminal 110 of the user working in the region 10 receives the configuration information about the following information processing devices from the information providing device 100 being in the same region 10:

a black and white printer (information processing device 112), a projector (information processing device 114), a display (information processing device 116), and a color MFP (information processing device 118).

As shown in FIG. 1, the wireless terminals 120-126 are attached on the information processing devices 112-118 respectively. The wireless terminals receive the positioning signal transmitted by the broadcasting devices 140-146 installed on the ceiling. A management table for device information shown in FIG. 9 associates the information processing devices with the wireless terminals in advance. The management table for device information is stored in the information providing device 100, for example. As shown in FIG. 9, the information processing devices and the wireless terminals are associated by using device identification information assigned to each of the information processing devices and identification information assigned to each of the wireless terminals (e.g. a MAC address).

The functional block is described for three major functions: "Network Establishing Function", "Positional Information Management Function" and "Configuration Information Providing Function".

(3.1 Network Establishing Function)

First, the function is explained for forming the network with the gateway 160, the broadcasting device 140, the communication terminal 110, and the wireless terminal 120.

The gateway 160 has a wireless communication control unit 715. The gateway 160 starts the network conforming to ZigBee, for example, and waits for other child devices. Also, the wireless communications control unit 715 keeps identification information (e.g. a MAC address) which may be used to identify the gateway 160 in the network.

The broadcasting device 140 has a wireless communication control unit 713. The broadcasting device 140 transmits a join request to the network started by the wireless communications control unit 715 of the gateway 160, and joins the network. In addition, the wireless communications control unit 713 waits for a connection from other child devices, and when the connection is established, the wireless communications control unit 713 relays data from the other child devices to another broadcasting device or the gateway 160. Also, the wireless communications control unit 713 keeps identification information (e.g. a MAC address) which may be used to identify the broadcasting device 140 in the network.

The communication terminal 110 (or the wireless terminal 120) has a wireless communications control unit 703. The communication terminal 110 transmits a join request to the nearest broadcasting device 140, and joins the network. Therefore, the communication terminal 110 operates as a ZigBee end device. The communication terminal 110 or the wireless terminal 120 stores identification information (e.g. a MAC address) in an identification information storage unit 708 discussed later, which may be used to identify the communication terminal 110 or the wireless terminal 1120 in the network 180.

By the above function, the gateway 160, the broadcasting device 140, the communication terminal 110, and the wireless terminal 120 may be connected via the wireless network 180. As a result, the communication terminal 110 or the wireless terminal 120 may transmit the positional information to the positional information management system 102 via the wireless network 180.

(3.2 Positional Information Management Function)

Second, the function is explained for obtaining and managing the positional information about the communication terminal 110 and the wireless terminals 120-126. The positional information about the communication terminal 110 and the wireless terminals 120-126 are stored in the positional information management system 102. The communication terminal 110 and the wireless terminals 120-126 have common functions to obtain the positional information, and then transmit the positional information to the positional information management system 102.

The broadcasting device 140 according to an embodiment of the invention has a positional information storage unit 700 and a positioning signal transmitting unit 702. A relaying unit 712 is described later.

The positional information storage unit 700 stores the positional information indicating the position at which the broadcasting device 140 is installed. The positional information may include, for example, information indicating latitude, longitude, and a floor number. The positional information may be set by an administrator for each of the broadcasting devices. The positional information set for the broadcasting devices 140-146 used in this embodiment is as follows:
- 35.66635 degrees north latitude, 139.76555 degrees east longitude, the fourth floor for the broadcasting device 140,
- 35.66630 degrees north latitude, 139.76555 degrees east longitude, the fourth floor for the broadcasting device 142,
- 35.66635 degrees north latitude, 139.76560 degrees east longitude, the fourth floor for the broadcasting device 144, and
- 35.66630 degrees north latitude, 139.76560 degrees east longitude, the fourth floor for the broadcasting device 146.

Here, the building number is not used to keep the explanation as simple as possible.

The positioning signal transmitting unit 702 constructs the positioning signal including the positional information stored in the positional information storage unit 700, and then transmits the positioning signal to the communication terminal 110 or the wireless terminals 120-126. For example, the positioning signal may be constructed with a frame structure defined by the IMES standard.

The communication terminal 110 or the wireless terminal 120 according to an embodiment has a positioning signal receiving unit 704, positional information obtaining unit 706, an identification information storage unit 708, and a positional information transmitting unit 710.

The positioning signal receiving unit 704 receives the positioning signal transmitted by any one of the broadcasting devices 140-146. In this embodiment, the communication terminal 110 and the wireless terminal 120 receive the positioning signal from the broadcasting device 140. Similarly, the wireless terminal 122 receives the positioning signal from the broadcasting device 142, the wireless terminal 124 receives the positioning signal from the broadcasting device 144, and the wireless terminal 126 receives the positioning signal from the broadcasting device 146, respectively. The positioning signal received by the positioning signal receiving unit 704 is passed to the positional information obtaining unit 706.

The positional information obtaining unit 706 obtains the positional information from the positioning signal constructed according to the IMES standard, which is received by the positioning signal receiving unit 704. The positional information may include information about latitude, longitude, and a floor number. In this embodiment, the communication terminal and each of the wireless terminals receives the following positional information:
- 35.66635 degrees north latitude, 139.76555 degrees east longitude, the fourth floor for the communication terminal 110;
- 35.66635 degrees north latitude, 139.76555 degrees east longitude, the fourth floor for the wireless terminal 120,
- 35.66630 degrees north latitude, 139.76555 degrees east longitude, the fourth floor for the wireless terminal 122,
- 35.66635 degrees north latitude, 139.76560 degrees east longitude, the fourth floor for the wireless terminal 124, and
- 35.66630 degrees north latitude, 139.76560 degrees east longitude, the fourth floor for the wireless terminal 126.

The positional information transmitting unit 710 receives the positional information from the positional information obtaining unit 710.

The identification information storage unit 708 stores the identification information about the communication terminal 110 or the wireless terminal 120. The identification information may be the MAC address of the first communication circuit 415. The identification information about the communication terminal 110 and each of the wireless terminals 120-126 is as follows:
- "002673abcd01" for the communication terminal 110,
- "002673abcd02" for the wireless terminal 120,
- "001002abcd03" for the wireless terminal 122,
- "002003abcd04" for the wireless terminal 124, and
- "005001abcd05" for the wireless terminal 126.

The positional information transmitting unit 710 transmits the positional information obtained by the positional information obtaining unit 706 and the identification information stored in the identification information storage unit 708 to the positional information management system 102. The broadcasting devices 140-146 and the gateway 160 may relay the positional information and the identification information in the network 180 to the positional information management system 102. In this embodiment, the broadcasting device 140 relays the positional information and the identification information transmitted by the communication terminal 110 or the wireless terminal 120 at first. Next, the other broadcasting devices 142-146 relay the positional information and the identification information to the positional information management system 102 via the gateway 160. On the other hand, the broadcasting device 142 relays the positional information and the identification information transmitted by the wireless terminal 122 at first. Next, the other broadcasting devices and the gateway 160 relay the positional information and the identification information to the positional information management system 102. Similarly, the broadcasting devices 144, 146 relay the positional information and the identification information transmitted by the wireless terminals 124, 126, respectively, at first. Next, the other broadcasting devices and the gateway 160 relay the positional information and the identification information to the positional information management system 102. In this way, the communication terminal 110 and the wireless terminal 120 transmit the positional information and the identification information to the broadcasting device which initially transmits the positioning signal. A process of the relay function performed by the broadcasting devices 140-146 and the gateway 160 is described in detail later. The communication terminal 110 and the wireless terminal 120 may transmit the positional information and the identification information at any time. For example, the communication terminal 110 and the wireless terminal 120 may transmit the positional information and the identification information at a predetermined time, or periodically, or when an acceleration sensor incorporated in the wireless terminal 120 detects change in a rate of acceleration.

The broadcasting device 140 according to an embodiment of the invention has a relaying unit 712.

The relaying unit 712 relays the positional information and the identification information which are transmitted by the communication terminal 110 or the wireless terminal 120 to the positional information management system 102. The relaying unit 712 conveys the positional information and the identification information to the next node (i.e. another broadcasting device or the gateway 160) depending on routing information stored in the broadcasting device 140. Finally, the positional information management system 102, via the gateway 160, receives the positional information and the identification information transmitted by the communication terminal 110 and the wireless terminal 120. When the network 180 is formed with ZigBee, the relaying unit 712 may provide functions of a ZigBee router, which may relay data from a ZigBee end point or other ZigBee routers.

The gateway 160 according to an embodiment of the invention has a communication transformation unit 714, and may manage the network 180. When the network 180 is formed with ZigBee, the gateway may provide the function of a ZigBee coordinator.

The communication transformation unit 714 transforms a format of data received from the broadcasting devices 140-146 forming the network 180 into another format which is suitable for the external network (e.g. the network 190 shown in FIG. 1).

The positional information management system 102 according to an embodiment of the invention has a positional information receiving unit 716 and a positional information storage unit 718.

The positional information receiving unit 716 receives the positional information and the identification information transmitted by the communication terminal 110 and the wireless terminal 120-126. The positional information storage unit 718 stores the positional information and the received identification information.

The positional information storage unit 718 may store the positional information for every terminal using the received identification information. FIGS. 8A-8E show tables storing the positional information (hereafter called "management table for positional information"). The management table for positional information may store the positional information received from the communication terminal and each of the wireless terminals with information about received date and time. FIG. 8A shows an example of the management table for positional information storing the positional information about the communication terminal 110. FIG. 8B shows an example of the management table for positional information storing the positional information about the wireless terminal 110. FIG. 8C shows an example of the management table for positional information storing the positional information about the wireless terminal 112. FIG. 8D shows an example of the management table for positional information storing the positional information about the wireless terminal 114. FIG. 8E shows an example of the management table for positional information storing the positional information about the wireless terminal 116. The management table for positional information shown in FIGS. 8A-8E indicates only the last received positional information and received date and time.

Based on the above function, the positional information management system 102 may store the positional information about the communication terminal 110 and the wireless terminals 120-126 (i.e. the information processing device 112-118).

Alternatively, the communication terminal 110 may obtain the positional information via an external communication terminal attached to the communication terminal 110 in common with the other information processing devices.

(3.3 Configuration Information Providing Function)

Next, the function is explained that the information providing device 100 provides the communication terminal 110 with configuration information about the information processing device (e.g. connection information, driver information, functional setting information). The image output processing includes printing or display of an image. The following example is described provided that the positional information management system 102 stores the positional information about the communication terminal 110 and the wireless terminals 120-126 according to the above positional information management function.

The communication terminal 110 according to an embodiment of the invention has an output condition loading unit 720 and a configuration information requesting unit 722 (remaining functional blocks are explained later). The output condition loading unit 720 loads output conditions about the image output processing which is specified by the user in advance. Examples of the output conditions are as follows (1) Paper Size (A4, A3, B4, B5, etc.),
(2) Print Colors (Black and white, Color etc.),
(3) Display resolution (800×600, 1024×768, 1280×1024 etc.), and
(4) Display colors (8 bits, 16 bits, and 32 bits).

The above items of the output condition are merely examples, and other items may be included. The user may specify the output conditions with an input device of the communication terminal 110. The output conditions may be described in a configuration file in the form of a text file, for example. The output conditions may be defined for processing type (e.g. printing or displaying). In particular, the above items (1) and (2) are for printing and the items (3) and (4) are for displaying. In this example, the output conditions are specified as follows:

(1) "A4" for Paper Size,
(2) "Color" for Print Colors,
(3) "1280×1024" for Display resolution, and
(4) "any" for Display colors.

The output condition loading unit 720 passes information indicating the loaded output conditions to the configuration information requesting unit 722.

After the configuration information requesting unit 722 receives the information indicating the output conditions from the output condition load unit 720, the configuration information requesting unit 722 transmits a request to the information providing device 100 for providing the configuration information about a nearest information processing device which is placed in the same region with the communication terminal 110. The configuration information requesting unit 722 transmits the request to the information providing device 100 along with data indicating the output condition received from the output condition loading unit 720. The output condition may be expressed in the form of eXtensible Markup Language (XML) which describes names of the items of the condition and a setting value according to predetermined format. The configuration information requesting unit 722 may transmit the request to the information providing device 100 via the network 180, which is used to convey the positional information in the positional information management function. Alternately, the configuration information requesting unit 722 may transmit the request to the information providing device 100 with a wired LAN or a wireless LAN via the network 190.

The information providing device 100 according to an embodiment of the invention has a configuration information request receiving unit 724, a region determining unit 726, a device determining unit 728, a positional information obtaining unit 730, a region information storage unit 732, a configuration information transmitting unit 734 and a configuration information storage unit 736.

The configuration information request receiving unit 724 receives the request transmitted by the configuration information requesting unit 722 of the communication terminal 110. In addition, the configuration information request receiving unit 724 receives the data indicating the output condition, which is transmitted by the configuration information requesting unit 722 of the communication terminal 110. The configuration information request receiving unit 724 sends a notification of the reception of the request to the region determining unit 726. The configuration information request receiving unit 724 also passes the data indicating the output condition to the device determining unit 728.

When the region determining unit 726 receives the notification from the configuration information request receiving unit 724, the region determining unit 726 determines a region where the communication terminal 110 is. The region determining unit 726 determines the region where the communication terminal 110 is by using the positional information about the communication terminal 110 obtained through the positional information management function and a table which associates positional information with a region. The region determining unit 726 passes the identification information about the communication terminal 110 to the positional information obtaining unit 730, and then obtains the positional information about the communication terminal. As shown in FIG. 10, the table associating positional information with a region is defined as a region information table, which is stored in the region information storage unit 732. An example of the region information table shown in FIG. 10 defines a rectangular region, whose boundaries are expressed by north latitude and east longitude. In this example, the positional information about the communication terminal 110, which is obtained by the positional information obtaining unit 730, indicates 35.66635 degrees north latitude, 139.76555 degrees east longitude, and the fourth floor as shown in FIG. 8A. Thus, the region determining unit 726 refers to the region information table shown in the FIG. 10, and then determines "A4-S SIDE" as the region where the communication terminal 110 is. The region determining unit 726 passes the region name of the determined region to the device determining unit 728.

The device determining unit 728 determines one or more information processing devices which are placed in the region determined by the region determining unit 726 and which meet the output condition received from the communication terminal 110.

First, the device determining unit 728 passes identification information of all of known information processing devices to the positional information obtaining unit 730, and obtains positional information of them. A management table for device information shown in FIG. 9 may provide information about the known information processing devices.

The management table for device information shown in FIG. 9 stores the identification information about the wireless terminals attached to the information processing devices. For example, the management table for device information may be stored in a storage unit of the information providing device 100. The device determining unit 728 may obtain the positional information about the information processing devices associated with the wireless terminals by using the identification information about the wireless terminals and referring to the positional information about the wireless terminals. In this example, the positional information about the information processing devices is as follows:

35.66635 degrees north latitude, 139.76555 degrees east longitude, the fourth floor for the information processing device 112, 35.66630 degrees north latitude, 139.76555 degrees east longitude, the fourth floor for the information processing device 114, 35.66635 degrees north latitude, 139.76560 degrees east longitude, the fourth floor for the information processing device 116, and 35.66630 degrees north latitude, 139.76560 degrees east longitude, the fourth floor for the information processing device 118.

Next, the device determining unit 728 refers to the region information table shown in FIG. 10, which is stored in the region information storage unit 732, and determines regions corresponding to the positional information about the information processing devices. In this example, the region in which the above information processing devices are placed is "A4-S SIDE".

Next, the device determining unit 728 determines the information processing devices whose region is identical to the region where the communication terminal 110 exists. In this example, the region where the communication terminal 110 exists is "A4-S SIDE", and the region where the information processing devices 112-118 are placed is also "A4-S SIDE". Thus, the device determining unit 728 determines all of the above information processing devices 120-126.

Next, the device determining unit 728 compares the output condition received from the communication terminal 110 with the predefined functional information about the information processing devices, and determines the information processing device whose function meets the output condition. The functional information about the information processing devices corresponds to the output condition included in the data received from the configuration information request receiving unit 724. As shown in FIG. 11, a functional information table defines the functional information. The storage unit of the information providing device 100 may store the functional information table. The functional information table shown in FIG. 11 stores the functional information associated with the device identification information about the information processing devices. In particular, the FIG. 11 shows that the information processing device 112 (i.e. a black and white printer) supports printing function with (1) Paper Size "A4" and "B5" and (2) Print Colors "Black and white". Here, the functional information about (3) Display resolution and (4) Display colors is not stored because the information processing device 110 solely performs printing processing. On the other hand, the information processing device 114 (i.e. a projector) does not support printing processing such as (1) Paper Size and (2) Print Colors but displaying processing such as (3) Display resolution and (4) Display colors. The administrator of the information providing device 100 may manually input the functional information. Alternatively, The information providing device 100 may automatically collect the functional information by sending inquiries about the functional information to the information processing devices. In this example, the device determining unit 728 receives the following output condition from the communication terminal 110:

(1) "A4" for Paper Size,
(2) "Color" for Print Colors,
(3) "1280×1024" for Display resolution, and
(4) "any" for Display colors.

In this example, the device determining unit 728 refers to the functional information table shown in FIG. 11, and determines the information processing device 118 which meets the conditions (1) and (2), and the information processing device 116 which meets the conditions (3) and (4).

The device determining unit 728 passes the identification information about the determined information processing devices to the configuration information transmitting unit 734. In this example, the device determining unit 728 passes the device identification information "#004" of the information processing device 116 and "#005" of the information processing device 118 to the configuration information transmitting unit 734.

The positional information obtaining unit 730 obtains the positional information about the communication terminal or the information processing devices, from the positional information storage unit 718 of the positional information management system 102, which have the identification information received from the region determining unit 726 or the device determining unit 728. An example of the management table for positional information indicating the positional information is shown in FIG. 8, which is stored in the positional information storage unit 718. The positional information obtaining unit 730 passes the obtained positional information to the region determining unit 726 or the device determining unit 728.

The region information storage unit 732 stores a region information table associating a region with positional information. FIG. 10 shows an example of the region information table. The example of the region information table shown in FIG. 10 defines a rectangular region, whose boundaries are expressed by north latitude and east longitude. As stated above, the region determining unit 726 and the device determining unit 728 refer to the region information table to determine the region where the communication terminal 110 or the information processing devices 112-118 (i.e. the wireless terminals 120-126) are placed.

The configuration information transmitting unit 734 transmits the configuration information about the information processing device having the identification information received from the device determining unit 728. In addition, the configuration information transmitting unit 734 transmits a message indicating that an error occurs during the above procedure to the communication terminal 110. For example, the configuration information about the information processing device may include information which allows the communication terminal 110 to order the information processing device to perform the desired image output processing. Examples of the configuration information are as follows:

Connection information to connect the information processing device (e.g. an IP address, a host name, a login ID, a password or the like), Driver information required to order the information processing device to perform the image output processing (e.g. a driver package or a driver configuration file), and Functional setting information for an individual function of the information processing device (e.g. an individual configuration file for the information processing device).

A configuration information table stored in the configuration information storage unit 736 stores the configuration information. The configuration information transmitting unit 734 obtains the configuration information about the determined information processing device from the configuration information storage unit 736, and submits the configuration information to the communication terminal 110. In this example, the configuration information transmitting unit 734 transmits the following configuration information about the information processing device 116 (the device identification information "#004") and the information processing device 118 (the device identification information "#005"):

driver information "widi_installer.exe" for the information processing device 116, and connection information "mprint01.company.com", driver information "color_mfp.exe", and functional setting information "color_mfp_config1.rst" for the information processing device 118.

The configuration information transmitting unit 734 may transmit the configuration information as a single archive file or two or more separated files to the communication terminal 110. The configuration information may be expressed and transmitted in any format.

The configuration information storage unit 736 stores the configuration information about all of the information processing devices. FIG. 12 shows an example of the configuration information table. The configuration information storage unit 736 may also store a file listed in the configuration information table. The configuration information storage unit 736 may provide the configuration information transmitting unit 736 with the configuration information about the information processing device which is determined by the configuration information transmitting unit 734.

The communication terminal 110 according to an embodiment of the invention also has a configuration information receiving unit 740 and a configuration unit 742.

The configuration information receiving unit 740 receives the configuration information about the information processing device, which is transmitted by the information providing device 100. The storage unit of the communication terminal 110 stores the received configuration information. In this example, the configuration information about the information processing devices 116, 118 is stored. When the configuration information receiving unit 740 receives the configuration information, the configuration information receiving unit 740 sends a notification to the configuration unit 742, which indicates that the configuration information is received. In addition, the configuration information receiving unit 740 may receive an error message from the information providing device 100. A display unit of the communication terminal 110 may display the error message.

When the configuration unit 742 receives the notification from the configuration information receiving unit 740, the configuration unit 742 configures the communication terminal 110 using the configuration information about the information processing device stored in the storage unit. In particular, the configuration unit 742 installs the driver information (or the driver package) about the information processing device, which is included in the configuration information received from the information providing device 100, to the system of the communication terminal 110. Next, the configuration unit 742 configures the system using the connection information about the information processing device so that the communication terminal 110 can access the information processing device. In addition, the configuration unit 742 copies the functional setting information (the individual configuration file), which is included in the configuration information which is received, to the system.

In this example, the configuration unit 742 may configure the communication terminal 110 using the configuration information about the information processing device 116 (the display). Here, the information processing device 116 is able to output a screen which is being displayed on the communication terminal 110 by means of wireless communications. Intel Wireless Display (WiDi) or other technologies may be used to output the screen by wireless communications. This invention may employ any other method to output the screen. When the configuration information receiving unit 740 receives the configuration information, the configuration unit 742 executes "widi_installer.exe" as a driver file. After that, the configuration unit 742 completes installation of the driver required to output the screen to the information processing device 116. As a result, the user of the communication terminal 110 may allow the information processing device 116 to show the screen with no manual installation of the driver file.

Next, the configuration unit 742 may configure the communication terminal 110 using the configuration information about the information processing device 118 (the color MFP). Here, the information processing device 118 is able to print a document stored on the communication terminal 110 via a network. When the configuration information receiving unit 740 receives the configuration information, the configuration unit 742 executes "color_mfp.exe" as a driver file. After that, the configuration unit 742 completes installation of the driver required to send a request for printing to the information processing device 118. Next, the configuration unit 742 registers the connection information "mprint01.compnay.com" to the system of the communication terminal 110 as a the network address of the information processing device 118. Next, the configuration unit 742 copies "color_mfp_config1.rst", which stores the functional setting information, to the predetermined location, and allows the communication terminal 110 to order the information processing device 118 to print the document using the functional setting information. The file "color_mfp_config1.rst" describes the combination of settings such as a paper size, a color, one-side or both side, or the like. The file is loaded when the document is printed. As a result, the user of the communication terminal 110 may allow the information processing device 118 to print the document with no manual installation of the driver file, no manual search for the printer on the network, and no individual setting for the printer.

The configuration unit 742 may omit some of the above configuration procedures when such configuration has already been done with the configuration information about the information processing device which is received. In particular, the configuration unit 742 need not configure the system again when the connection configuration or the driver installation for the information processing device has already been done. On the other hand, the functional setting information may be different depending on the information processing device. Thus, the configuration unit 742 may re-configure the system using updated functional setting information about the information processing device.

In addition, when the configuration unit 742 obtains the configuration information about a plurality of image forming devices having common function (e.g. a plurality of printers, a plurality of projectors, a plurality of displays), the configuration unit 742 may configure the system so that the system can use one of them on a priority basis. When the configuration unit 742 receives the configuration information about both the information processing device 112 (the black and white printer) and the information processing device 118 (the color MFP), the configuration unit 742 may configure the system so that the system can use the former as the default printer. For example, the configuration unit 742 may configure the system so that the system can use the nearest information processing device. In this case, the communication terminal 110 may receive information about a physical distance, which is obtained by the device determining unit 728 of the information providing device 100 via the configuration information transmitting unit 734.

Based on the function, in case that the user has not installed the driver of the nearest information processing device in the communication terminal 110, the user may use the information processing device by obtaining necessary information from the information providing device 100. In addition, since the information providing device 100 provides the individual functional setting information about the information processing device, the user does not have to change the setting of the information processing device each time the user moves to a different location.

(4. Process Flow)

Next, the process of the information providing system 1 according to an embodiment of the invention is explained with reference to FIGS. 13 and 14. The process of the information providing system 1 is separated into three sub-processes and explained separately, which include establishing a network, providing positional information, and providing configuration information.

(4.1 Process to Establish a Network)

Figure 26:
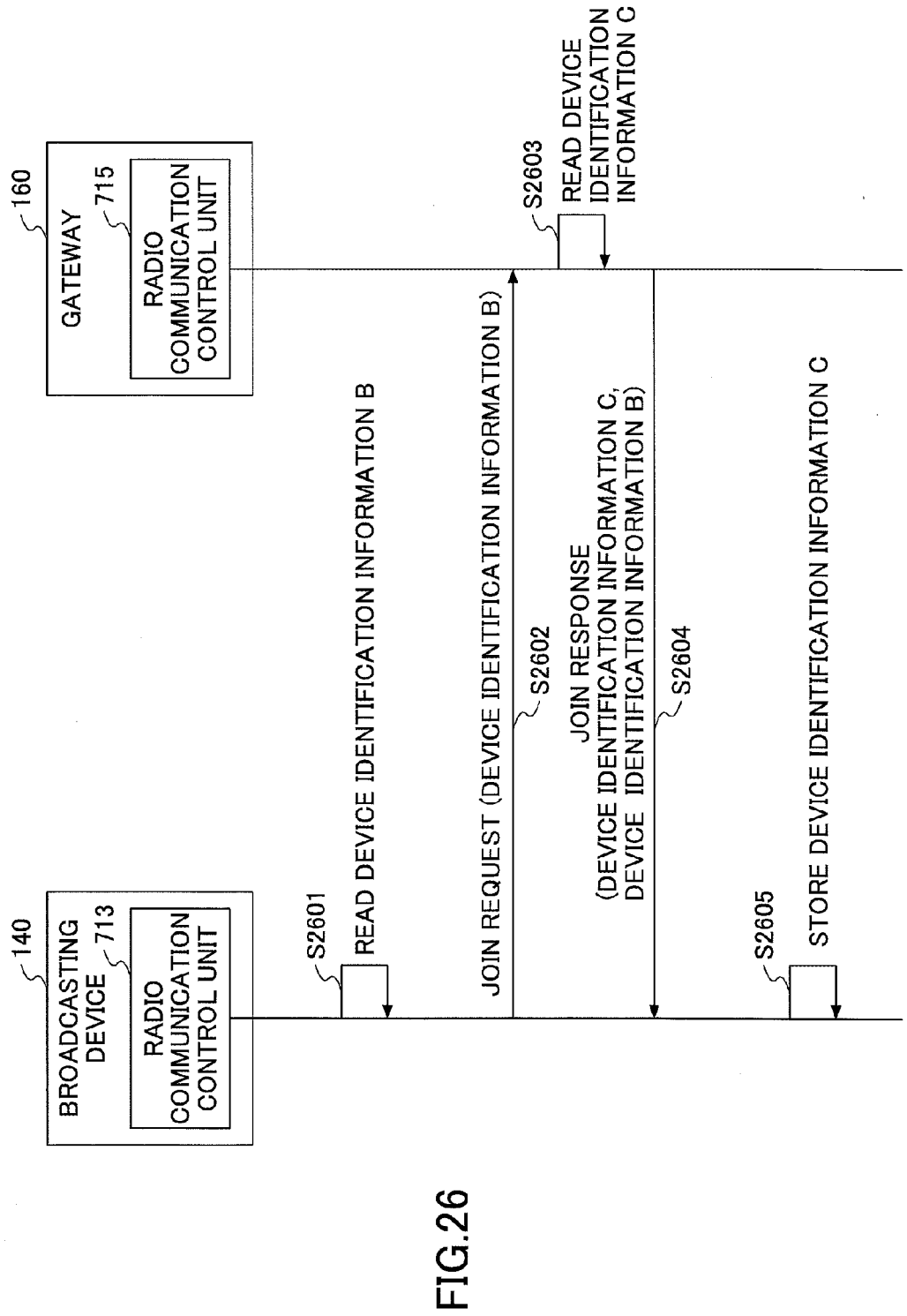
FIG. 26 is a sequence chart illustrating an exemplary process of establishing a communication network at a ceiling.

First, the process of the gateway 160 and the broadcasting device 140 is explained to establish a network with reference to FIG. 26. The following example is explained assuming that the gateway 160 has been turned on and the gateway 160 has finished initializing a network.

In Step S2601, the radio communication control unit 713 of the broadcasting device 140 reads device identification information B.

In Step S2602, the wireless communications control unit 713 of the broadcasting device 140 transmits a join request including the device identification information B to the gateway 160.

In Step S2603, the wireless communication control unit 715 of the gateway 160 reads device identification information C.

In Step S2604, the wireless communication control unit 715 of the gateway 160 transmits a join response including the device identification information B and the device identification information C to the broadcasting device 140.

In Step S2605, the wireless communications control unit 713 of the broadcasting device 140 stores the device identification information C.

As stated above, the network is established for communications between the gateway 160 and the broadcasting device 140.

(4.2 Process to Provide Positional Information)

Figure 13:
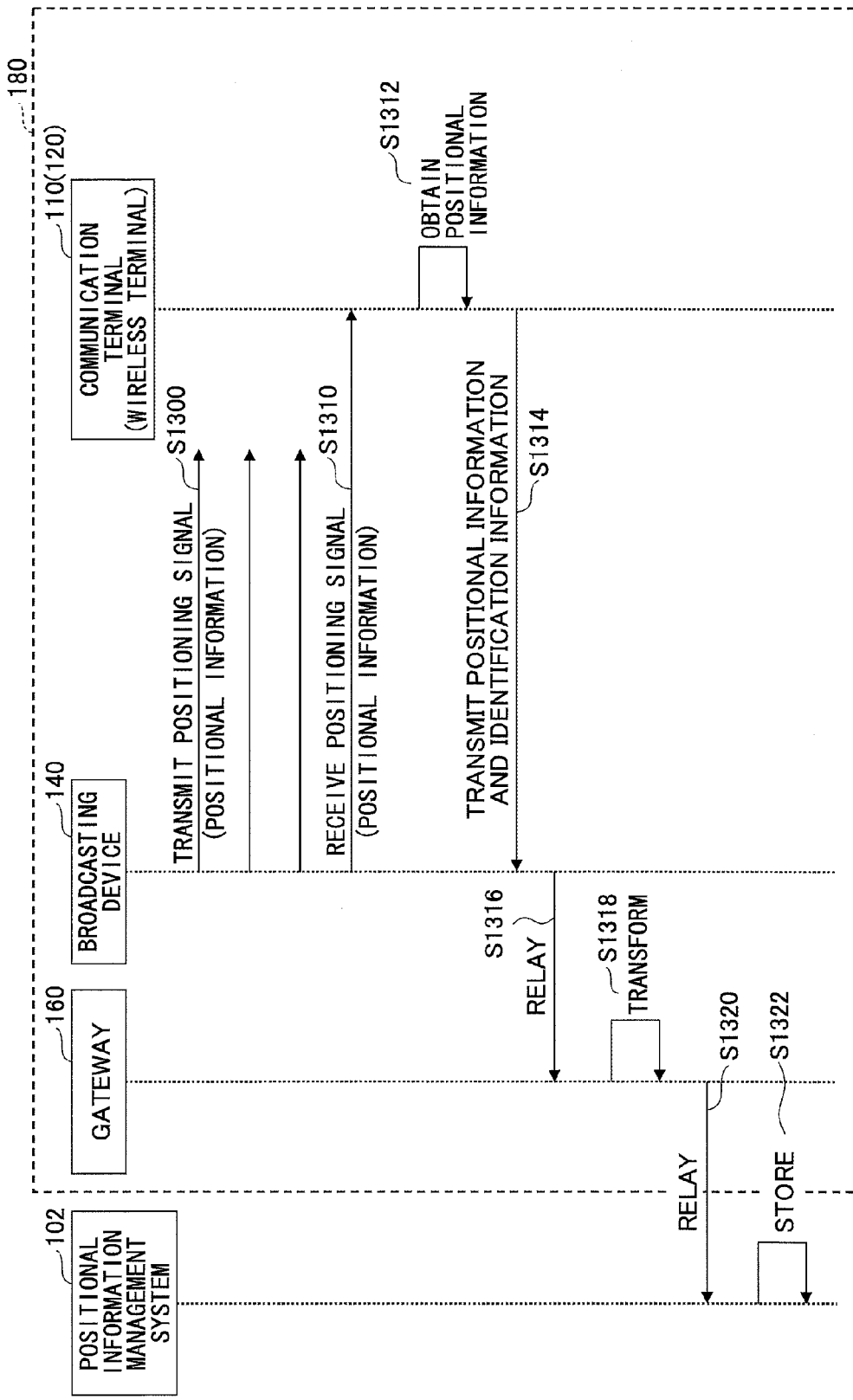
FIG. 13 is a sequence chart illustrating an exemplary process of obtaining positional information performed by an information providing system according to an embodiment.

Next, the process of the positional information management system 102 is explained to obtain the positional information about the communication terminal 110 or the wireless terminals 120-126 via the network 180 with reference to FIG. 13. The following example is explained about the communication terminal 110 receiving the positioning signal from the broadcasting device 140. The broadcasting device 140 has the following positional information: 35.66635 degrees north latitude, 139.76555 degrees east longitude, and the fourth floor.

In Step 1300, the positioning signal transmitting unit 702 of the broadcasting device 140 continues to broadcast the positioning signal including the above positional information in a predetermined area.

In Step 1310, the positional signal receiving unit 704 of the communication terminal 110 receives the positioning signal from the positioning signal transmitting unit 702 of the communication terminal 110.

In Step 1312, the positional information obtaining unit 706 of the communication terminal 110 obtains the positional information from the received positioning signal. The positional information is stored in a predetermined position of the frame of the positioning signal conforming to the IMES standard. In this example, the communication terminal 110 receives the following positional information—35.66635 degrees north latitude, 139.76555 degrees east longitude, and the fourth floor.

In Step 1314, the positional information transmitting unit 710 of the communication terminal 110 transmits the identification information stored in the identification information storage unit 708 along with the positional information to the broadcasting device 140. Here, the identification information about the communication terminal 110 (i.e. MAC address of the first communication circuit 415) is "002673abcd01".

In Step 1316, the relaying unit 712 of the broadcasting device 140 relays the positional information and the identification information received from the communication terminal 110 to the gateway 160.

In Step 1318, the communication transformation unit 714 of the gateway 160 transforms a format of communication data including the information relayed from the broadcasting device 140 of the network 180 into an another format which is suitable for the network 190 (e.g. LAN).

In Step 1320, the positional information receiving unit 716 of the positional information management system 102 receives the positional information and the identification information via the broadcasting device 140 and the gateway 160.

In Step 1322, the positional information storage unit 718 of the positional information management system 102 stores the received positional information and the identification information about the communication terminal 110. FIG. 8A shows an example of the management table for positional information positional information about the communication terminal 110. In addition, FIGS. 8B-8E show other examples of the management table for positional information storing information about the wireless terminals 120-126.

As stated above, the information providing system 1 according to this embodiment of the invention is able to manage the positional information about the communication terminal 110 of the user and the wireless terminals 120-126.

Next, with reference to FIGS. 27, 28, the process of the communication terminal 110 or the wireless terminal 120 (hereinafter collectively described "communication terminal") which has received the positional information from two broadcasting devices 140a and 140b is explained to determine one of the broadcasting devices to which the wireless terminal 120 should transmit the positional information and the identification information.

FIG. 27 shows an example that the communication terminal 110 receives the positional information from both the broadcasting devices 140a and 140b.

In Step S2701, the positioning signal transmitting unit 702 of the broadcasting device 140a reads positional information Xa stored in the positional information storage unit 700.

In Step S2702, the positioning signal transmitting unit 702 of the broadcasting device 140a transmits the positional information Xa read in Step S2701 to the communication terminal 110.

In Step S2703, the positioning signal transmitting unit 702 of the broadcasting device 140b reads positional information Xb stored in the positional information storage unit 700.

In Step S2704, the positioning signal transmitting unit 702 of the broadcasting device 140b transmits the positional information Xb read in Step S2703 to the communication terminal 110.

Next, the process of the communication terminal 110 which has received the positional information from both the broadcasting devices 140a and 140b for transmitting the positional information and the identification information to either of the broadcasting devices 140a, 140b is explained.

In Step S2801 of FIG. 28, the positioning signal receiving unit 704 of the communication terminal 110 receives the positional information Xa, Xb from the broadcasting devices 140a and 140b (corresponding to Steps S2702, S2704 in FIG. 27).

In Step S2802, the wireless communications control unit 703 of the communication terminal 110 reads identification information A stored in the identification information storage unit 708.

In Step S2803, the wireless communications control unit 703 of the communication terminal 110 transmits a join request including the device information A read in Step S2802 to both the broadcasting devices 140a and 140b.

In Step S2804, the wireless communications control unit 713 of the broadcasting device 140a reads identification information Ba of the broadcasting device 140a.

In Step S2805, the wireless communications control unit 713 of the broadcasting device 140a transmits a join response including the identification information A received in Step S2803 and the identification information Ba read in Step S2804 to the communication terminal 110.

In Step S2806, the wireless communications control unit 703 of the communication terminal 110 stores the identification information Ba received in Step S2805.

In Step S2807, the wireless communications control unit 713 of the broadcasting device 140b reads identification information Bb of the broadcasting device 140b.

In Step S2808, the wireless communications control unit 713 of the broadcasting device 140b transmits a join response including the identification information A received in Step S2803 and the identification information Bb read in Step S2807 to the communication terminal 110.

In Step S2809, the wireless communications control unit 703 of the communication terminal 110 stores the identification information Bb received in Step S2808.

In Step S2810, the wireless communications control unit 703 of the communication terminal 110 compares strength of the received radio signal including the join response received in Step S2805 with strength of the received radio signal including the join response received in Step S2808, and determines one of the broadcasting devices by whom the radio signal is received in higher strength as a destination to transmit the positional information and the identification information. Here, the strength of the received radio signal including the join response from the broadcasting device 140*b* is stronger than the one from the broadcasting device 140*a*.

In Step S2811, the positional information transmitting unit 710 of the communication terminal 110 transmits the identification information A of the communication terminal 110 and the positional information received from the broadcasting device 140*b* in Step S2801 to the broadcasting device 140*b*.

As stated above, the communication terminal 110 or the wireless terminal 120 may transmit the positional information and the identification information via the broadcasting device by which the radio signal is received with higher strength.

(4.3 Process to Provide Configuration Information)
(4.3.1 First Example)

Figure 15:
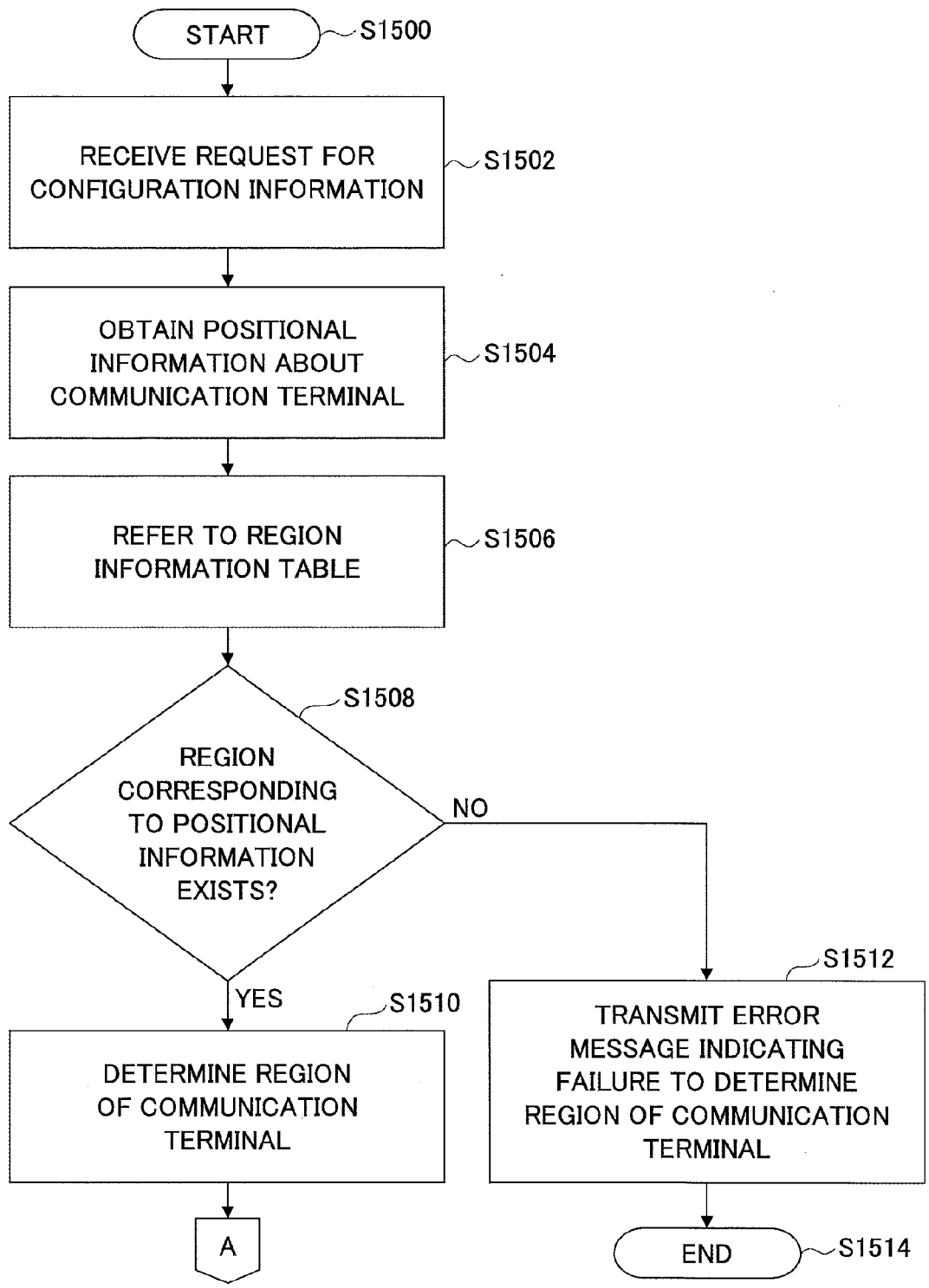
FIG. 15 is a flowchart illustrating a process performed by an information providing device according to an embodiment.
Figure 16:
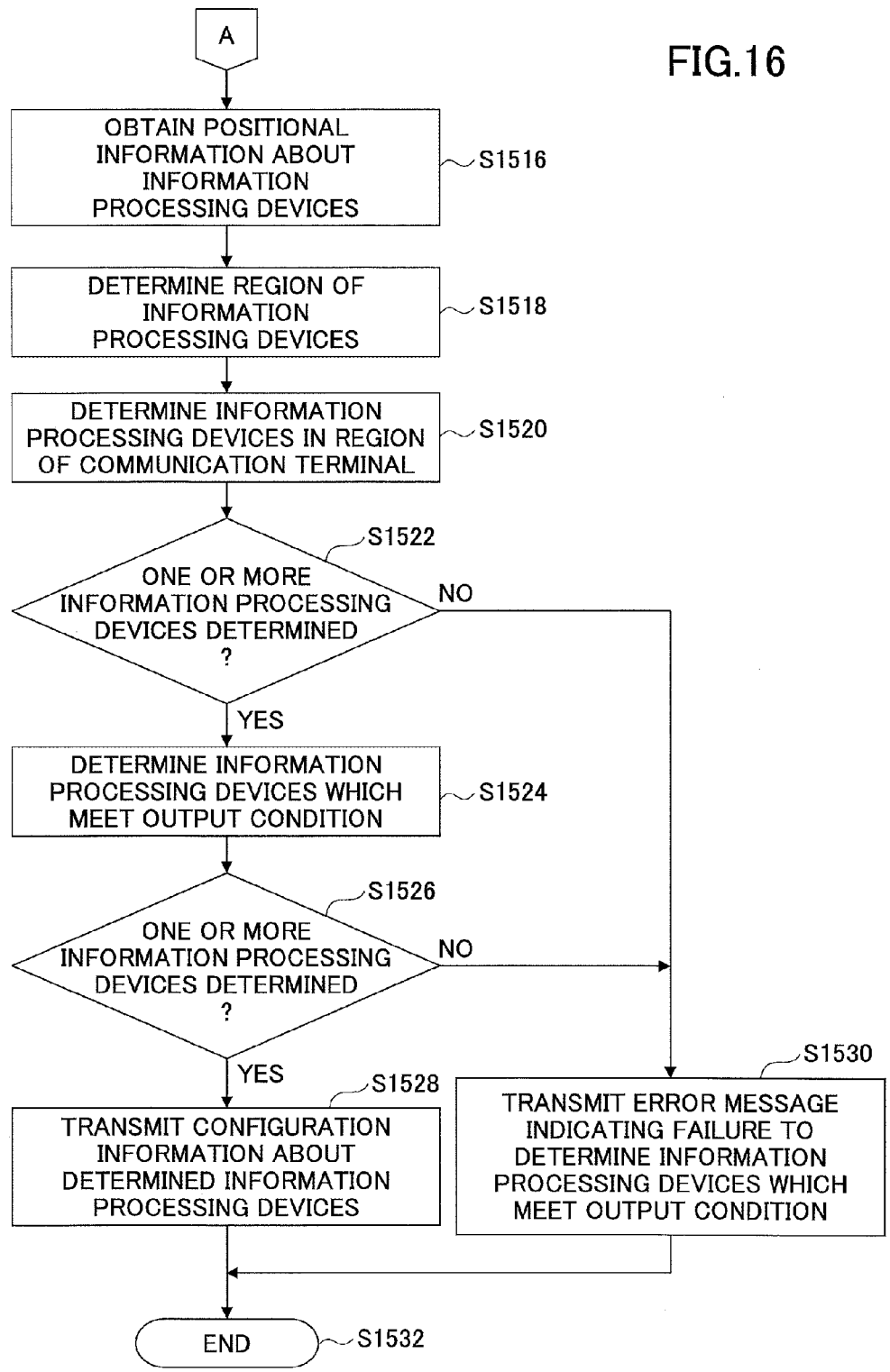
FIG. 16 is a flowchart illustrating a process performed by an information providing device according to an embodiment.

The process of the information providing device 100 for providing the communication terminal 110 with the configuration information (e.g. the connection information, the driver information, and the functional setting information) is explained. FIG. 14 shows a sequence of the process performed by units included in the information providing system 1. FIGS. 15 and 16 show a flowchart illustrating the process of the information providing device 100.

First, the flowchart illustrating the process of the information providing device 100 is explained with reference to FIGS. 15 and 16.

In Step S1500, the information providing device 100 starts the process.

In Step S1502, the configuration information request receiving unit 724 receives a request for the configuration information and data indicating the output condition from the configuration information requesting unit 722 of the communication terminal 110.

In Step S1504, the region determining unit 726 obtains via the positional information obtaining unit 730 the positional information about the communication terminal 110 which has transmitted the request.

In Step S1506, the region determining unit 726 refers to the region information table (FIG. 10) stored in the region information storage unit 732.

In Step S1508, whether the region corresponding to the positional information about the communication terminal is stored in the region information table (FIG. 10) of the region information storage unit 732 is determined. When the region is stored in the region information table (YES in Step S1508), the process proceeds to Step S1510. When the region is not stored in the region information table (NO in Step S1508), the process proceeds to Step S1512.

In Step S1510, the region determining unit 726 determines a region where the communication terminal 110 is positioned based on the region information table (FIG. 10), and the process proceeds to Step S1600 in FIG. 16.

On the other hand, in Step S1512, the configuration information transmitting unit 734 generates an error message indicating that the region where the communication terminal 110 is positioned cannot be found, and transmits the error message to the communication terminal 110. The display unit of the communication terminal 110 shows the error message. After that, the process proceeds to Step S1514 and ends.

In Step S1516 shown in FIG. 16, the device determining unit 728 obtains via the positional information obtaining unit 730 the positional information about the known information processing devices.

In Step S1518, the device determining unit 728 refers to the region information table (FIG. 10) stored in the region information storage unit 732 and determines regions where the information processing devices whose positional information are obtained in Step 1516 are positioned.

In Step S1520, the device determining unit 728 determines the information processing device(s) in the same region with the communication terminal 110 which has transmitted the request.

In Step S1522, whether one or more information processing devices are determined in Step 1520 is determined. When one or more information processing devices are determined (YES in Step S1520), the process proceeds to Step 1524. When one or more information processing devices are not determined (NO in Step S1520), the process proceeds to Step 1530.

In Step S1524, the device determining unit 728 determines one or more of the information processing devices determined in Step S1520 which meet the output condition received from the communication terminal 110.

In Step S1526, whether one or more of the information processing devices are determined in Step S1524 is determined. When one or more of the information processing devices are determined (YES in Step S1526), the process proceeds to Step S1528. When one or more of the information processing devices are not determined (NO in Step S1526), the process proceeds to Step S1530.

In Step S1528, the configuration information transmitting unit 734 transmits the configuration information about the information processing device(s) determined in Step S1524 to the communication terminal 110. The configuration information about the information processing device(s) is stored in the configuration information table of the configuration information storage unit 736 (FIG. 12) in advance.

On the other hand, in Step S1530, the configuration information transmitting unit 734 generates an error message indicating that no information processing device meeting the output condition exists in the region where the communication terminal 110 is positioned, and transmits the error message to the communication terminal 110. The display unit of the communication terminal 110 may display the error message.

In Step S1532, the process ends.

Next, the process of the information providing system 1 (See FIG. 22) including the information providing device 100 which operates as stated above is explained with reference to FIG. 14. The configurations of the communication terminal 110, the information processing devices 112-118, and the information providing device 100 are shown in FIG. 1.

In Step S1400, the process may start in response to user's input on an operation screen generated by software implementing the configuration information providing function on the communication terminal 110. Alternatively, the process may automatically start in response to a variation of positional information included in the positioning signal received from the broadcasting device.

In Step S1402, the output condition loading unit 720 of the communication terminal 110 reads the output condition regarding the image output processing which is determined by user in advance. The output condition may be described in a configuration file such as a text file in advance. The configuration file may be described in any format. In this example, the output condition has been determined by the user as follows:

(1) "A4" for Paper Size,
(2) "Color" for Print Colors, (3) "1280×1024" for Display resolution, and
(4) "any" for Display colors.

In Step S1404, the configuration information requesting unit 722 of the communication terminal 110 requests the information providing device 100 to transmit the configuration information about the information processing device (s) which is positioned in the same region with the communication terminal 110. In addition, data indicating the output condition which the output condition loading unit 720 has read is transmitted together. The configuration information request receiving unit 724 of the information providing device 100 receives the request and the data indicating the output condition.

In Step S1406, the region determining unit 726 obtains via the positional information obtaining unit 730 the positional information of the communication terminal 110 which has transmitted the request. In this example, the positional information of the communication terminal 110 obtained via the positional information obtaining unit 730 indicates: 35.66635 degrees north latitude, 139.76555 degrees east longitude, and the fourth floor.

In Step S1408, the region determining unit 726 refers to the region information table (FIG. 10) stored in the region information storage unit 732 and determines "A4-S SIDE" as a region where the communication terminal 110 is positioned.

In Step S1410, the device determining unit 728 obtains via the positional information obtaining unit 730 the positional information about the known information processing devices. As stated above, the positional information about the information processing devices is expressed as the positional information about the wireless terminals attached to the information processing devices. The known information processing devices are listed in the management table for device information shown in FIG. 9. In this example, the positional information about the information processing devices 112-118 (the wireless terminals 120-126) is obtained, which positional information is listed in the management table for device information. The obtained positional information is as follows:

- 35.66635 degrees north latitude, 139.76555 degrees east longitude, the fourth floor for the information processing device 112,
- 35.66630 degrees north latitude, 139.76555 degrees east longitude, the fourth floor for the information processing device 114,
- 35.66635 degrees north latitude, 139.76560 degrees east longitude, the fourth floor for the information processing device 116, and
- 35.66630 degrees north latitude, 139.76560 degrees east longitude, the fourth floor for the information processing device 118.

In Step S1412, the device determining unit 728 refers to the region information table (FIG. 10) stored in the region information storage unit 732 and determines regions where the information processing devices whose positional information is obtained in Step S1410 are positioned. In this example, all of the information processing devices 112-118 are positioned in "A4-S SIDE".

In Step S1414, the device determining unit 728 determines one or more of the information processing devices determined in Step S1412 to be in the same region with the communication terminal 110 which has transmitted the request. In this example, all of the information processing devices 112-118 are positioned in "A4-S SIDE" similar to the communication terminal 110. Here, the device determining unit 728 determines all of the information processing devices 112-118 to be in the same region.

In Step S1416, the device determining unit 728 determines one or more of the information processing devices determined in Step S1414 whose function meets the output condition received from the communication terminal 110. For this purpose, the device determining unit 728 compares the output condition received from the communication terminal 110 with functional information about the information processing devices defined in advance. The functional information about the information processing devices is stored in the functional information table. As stated above, the output condition used in this example includes: (1) Paper Size, (2) Print Colors, and (3) Display resolution. Here, the device determining unit 728 determines the information processing devices 116 and 188 as information processing devices which meet the output condition.

In Step S1418, the configuration information transmitting unit 734 transmits the configuration information about the information processing devices determined in Step S1416 to the communication terminal 110. The configuration information is stored in the configuration information table (FIG. 12) of the configuration information storage unit 736 in advance. In this example, the configuration information of the information processing device 116 having the identification information "#004" and the information processing device 118 having the identification information "#005" are transmitted.

The configuration information of the information processing device 116 includes the driver information "widi_installer.exe". The configuration information of the information processing device 118 includes the connection information "mprint01.company.com", the driver information "color_mfp.exe", and the functional setting information "color_mfp_config1.rst". The configuration information receiving unit 740 of the communication terminal 110 receives the transmitted configuration information.

In Step S1420, the configuration unit 742 of the communication terminal 110 configures the communication terminal 110 using the received configuration information. In this example, the configuration unit 742 executes "widi_installer.exe", which is the driver information about the information processing device 116, and completes the driver installation to output images from the communication terminal 110 to the information processing device 116. In addition, the configuration unit 742 executes "color_mfp.exe", which is the driver file for the information processing device 118, and completes the driver installation to order the information processing device 118 to print images. Next, the configuration unit 742 registers the connection information "mprint01.company.com" as a network address of the information processing device 118 in the system of the communication terminal 110. Next, the configuration unit 742 copies the functional setting file "color_mfp_config1.rst" to the predetermined location so that the communication terminal 100 can print a document with the file.

In Step S1422, the communication terminal 110 orders the information processing device 118 to perform the image output processing in response to user's instruction. In this example, the user may print a document created on the communication terminal 110 using the information processing device 118, which is a registered printer on the system. In addition, the user may display the screen of the communication terminal 110 on the information processing device 116 as an external display.

Therefore, the communication terminal 110 may obtain from the information providing device 100 the configuration information about the information processing devices which are positioned near the communication terminal and are able to output images with the output condition determined by the user. In this way, the user may use local information processing devices even at an unknown place with no driver installation or configuration.

In the above example, the information processing devices which meet the output condition specified by the user of the communication terminal 110 are determined. In the next example, the information processing devices are determined based on distance information about distances between the communication terminal 110 and each of the information processing devices.

(4.3.2 Second Example)

The process of the information providing system 1 to transmit the distance information about distances between the communication terminal 110 and each of the information processing devices is explained. The distance information is transmitted together with the configuration information about the information processing devices which are positioned in the region where the communication terminal 110 is positioned.

Figure 14:
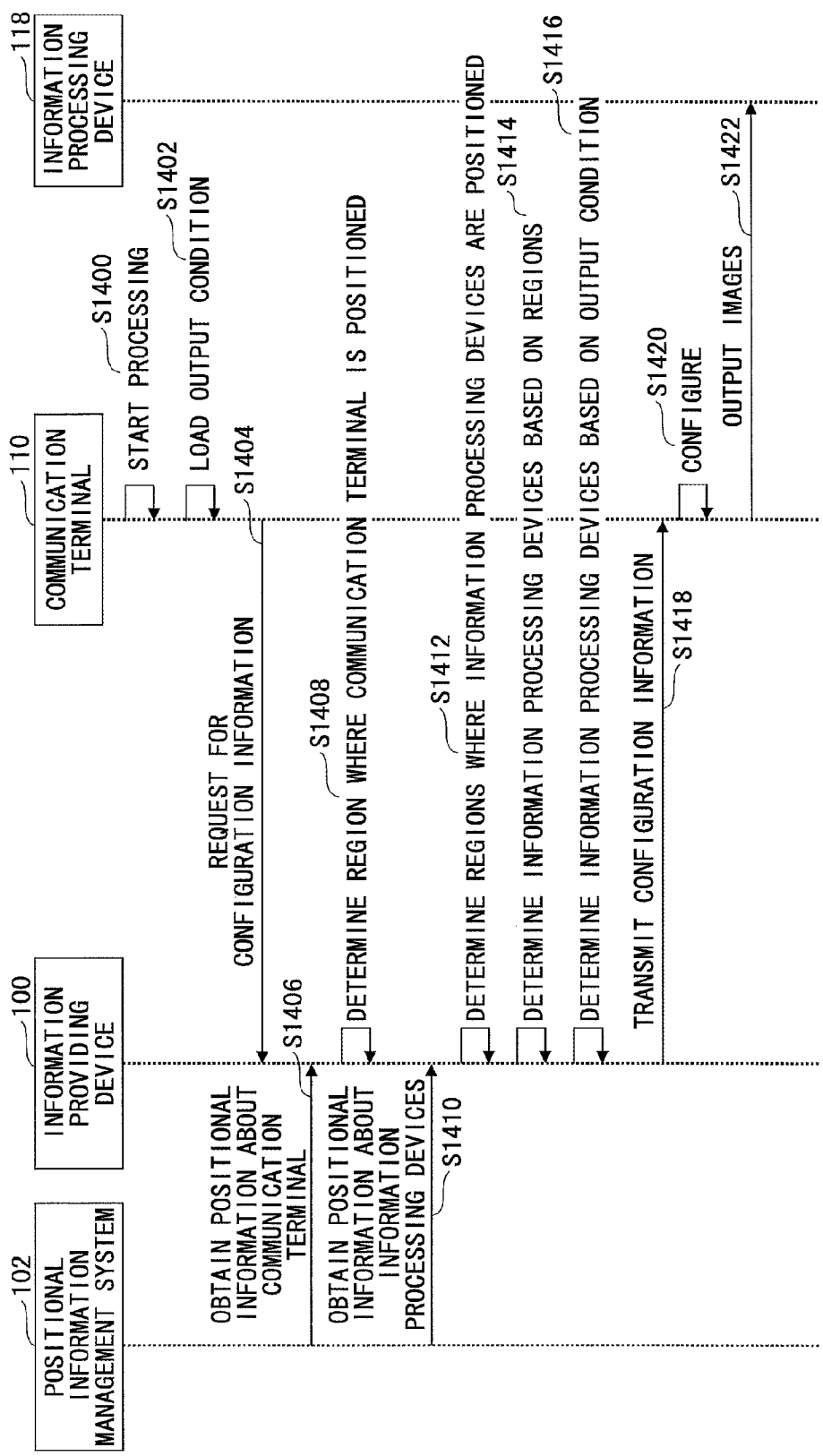
FIG. 14 is a sequence chart illustrating an exemplary process of providing configuration information performed by an information providing system according to an embodiment.
Figure 17:
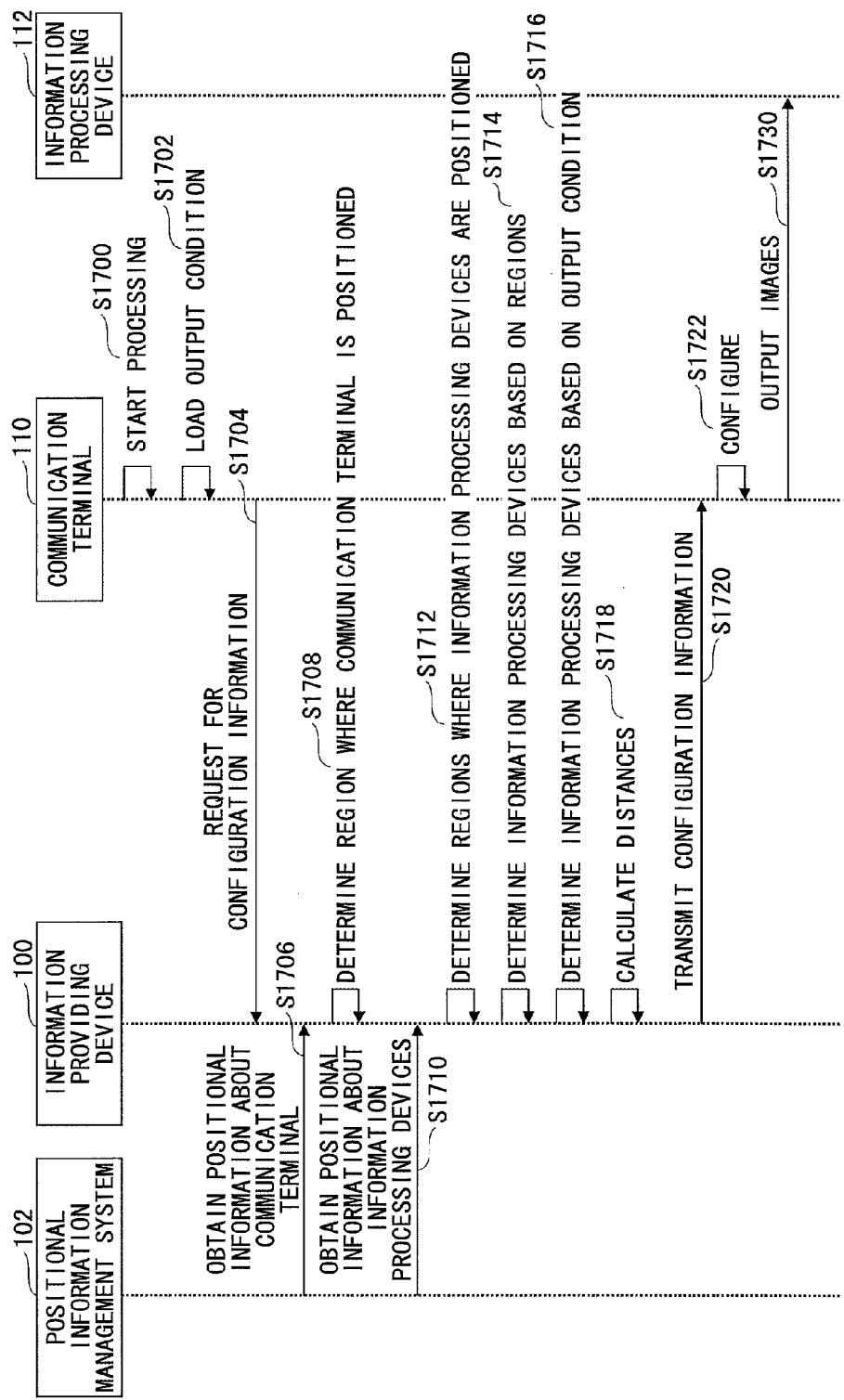
FIG. 17 is a sequence chart illustrating a second exemplary process of providing configuration information performed by an information providing system according to an embodiment.
Figure 18:
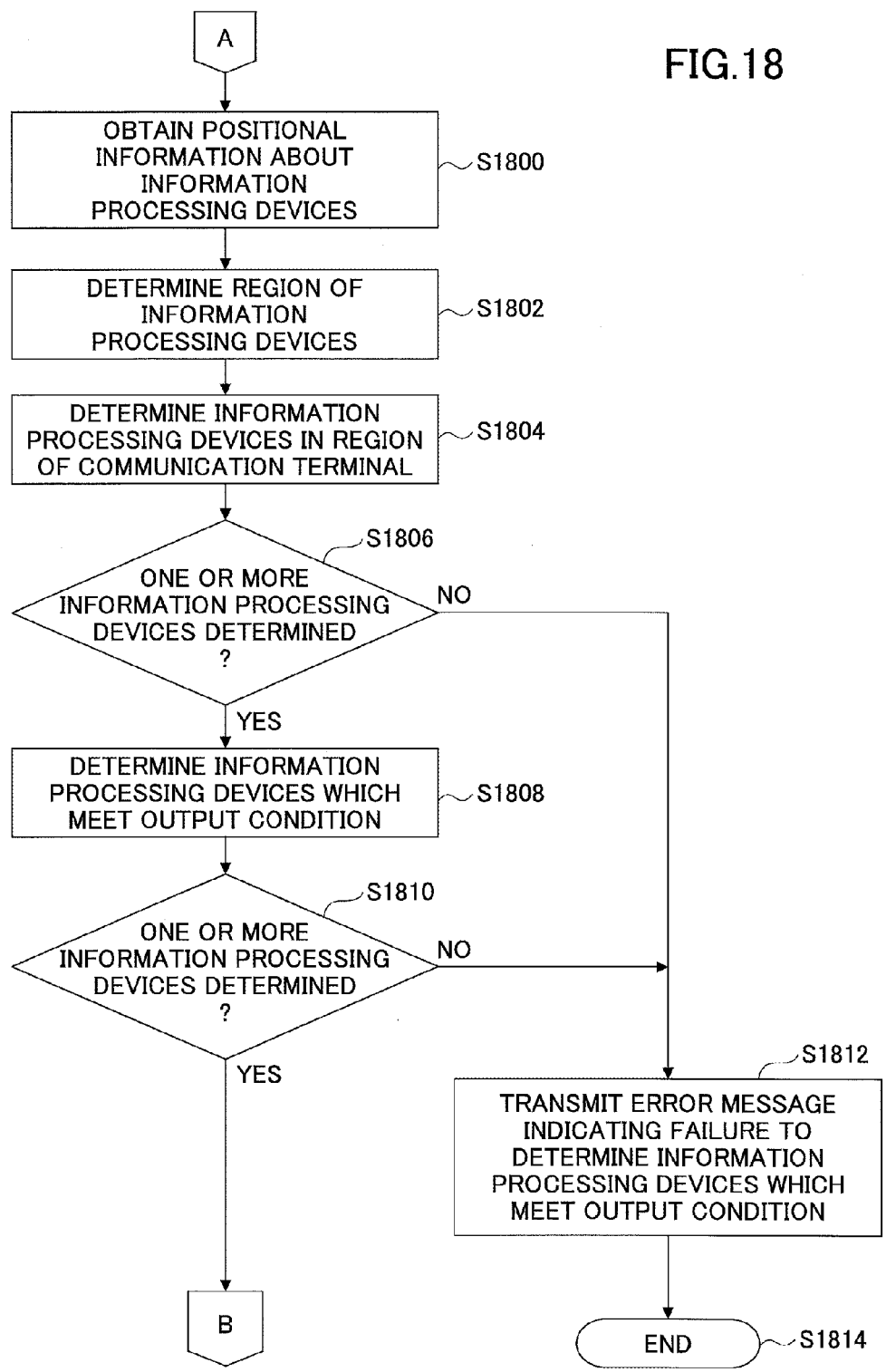
FIG. 18 is a flowchart illustrating a process performed by an information providing device according to an embodiment.
Figure 19:
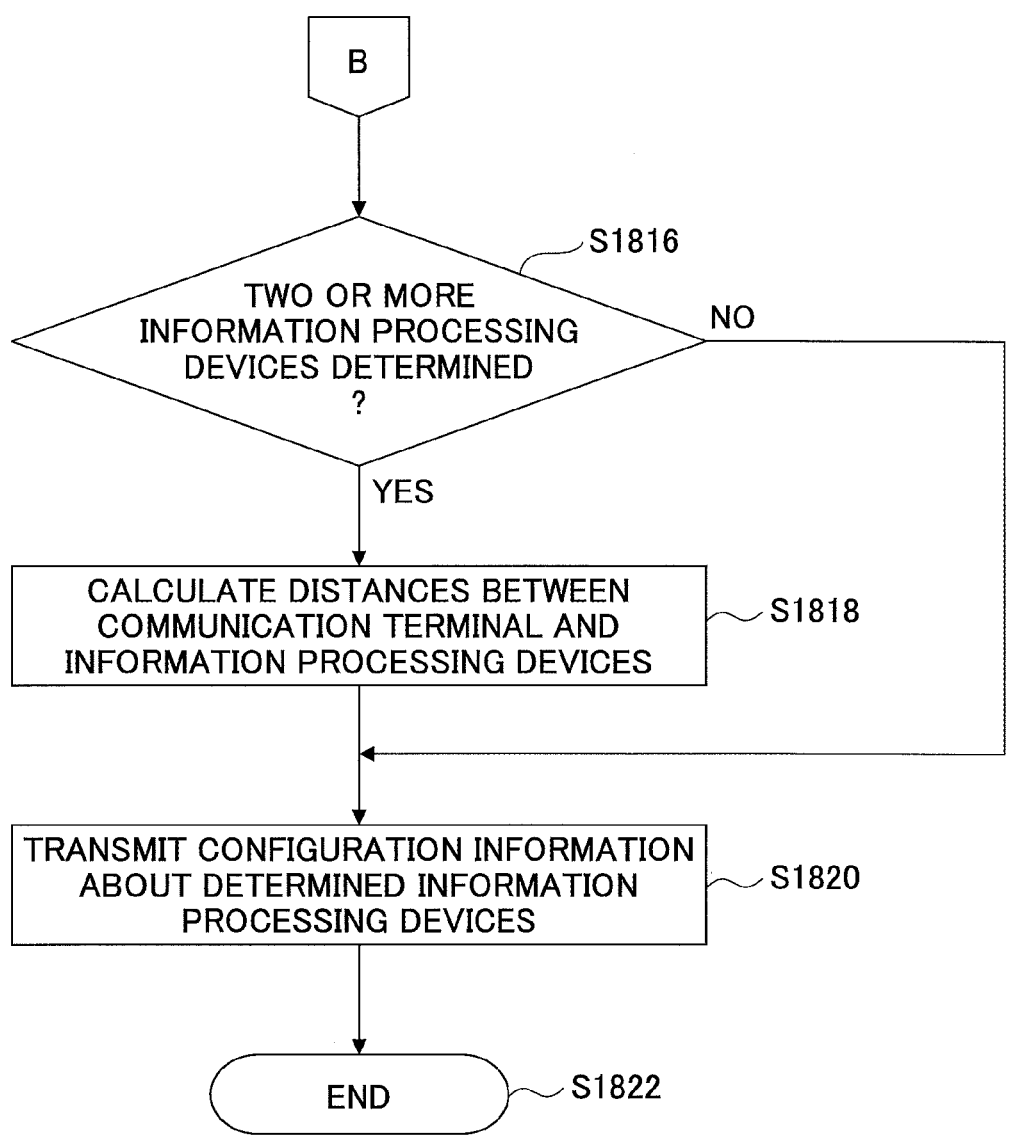
FIG. 19 is a flowchart illustrating a process performed by an information providing device according to an embodiment.

FIG. 17 shows a sequence of the process performed by the information providing system 1, which corresponds to the sequence shown in FIG. 14. FIGS. 15, 18, and 19 show a flowchart illustrating the process of the information providing device 100. The process shown in FIGS. 18 and 19 may be used instead of the process shown in FIG. 16. The following explanation is made by focusing on the differences of the process.

First, the flowchart illustrating the process of the information providing device 100 in this example is explained with reference to FIGS. 15, 18, and 19.

The information providing device 100 in this example performs Steps S1500-S1514 shown in FIG. 15 as previously stated.

Next, the information providing device 100 in this example performs Steps S1800-S1810 shown in FIG. 18. The process of the steps is similar to the process of Steps S1516-S1526 shown in FIG. 16 as stated above. Also, Steps S1812 and S1814 shown in FIG. 18 are similar to Steps S1530 and S1532 shown in FIG. 16. After Step S1810 shown in FIG. 18, the process proceeds to Step S1816 shown in FIG. 19.

In Step S1816, whether two or more information processing devices determined in Step S1808 exist or not is determined. When two or more information processing devices exist (YES in Step S1816), the process proceeds to Step S1818. When two or more information processing devices do not exist (NO in Step S1816), the process proceeds to Step S1820.

In Step S1818, the device determining unit 728 calculates physical distances between the determined information processing devices and the communication terminal 110 using their coordinates expressed by latitude and longitude. The physical distances may be calculated by a method which converts the coordinates into rectangular coordinates on a plane surface and calculates the distance or a method which directly calculates the distance using a formula (e.g. Hubeny formula). In this invention, any appropriate methods may be used to calculate the physical distance between two points.

In Step S1820, the configuration information transmitting unit 734 transmits the configuration information about the information processing devices determined in Step S1808 to the communication terminal 110. When Step S1818 is executed, the configuration information transmitting unit 734 transmits the distances calculated in Step S1818 which are associated with the configuration information of the information processing devices to the communication terminal 110.

In Step S1822, the process ends.

Alternatively, the process of the information providing device 100 may proceed to Step S1818 without the determining Step S1816 shown in FIG. 19, and the device determining unit 728 may calculate the distance between the sole information processing device determined in Step S1808 and the communication terminal 110. This allows the communication terminal 110 to use the distance to the specified sole information processing device for performing configuration of the communication terminal 101 or image output process.

Next, the sequence of the process of the information providing system 1 including the information providing device 100 is explained with reference to FIG. 17. The configurations of the communication terminal 110, the information processing devices 112-118, and the information providing device 100 are shown in FIG. 1. In this example, the output condition is determined as follows:

(1) "any" for Paper Size,
(2) "any" for Print Colors,
(3) "1600×1200" for Display resolution, and
(4) "32 bit" for Display colors.

Steps S1700-S1716 correspond to Steps S1400-S1416 shown in FIG. 14, respectively. In this example, the information processing devices 112 and 118 are determined in Step S1716 according to the output condition.

In Step S1718, the device determining unit 728 calculates physical distances between the determined information processing devices and the communication terminal 110 using their coordinates expressed by latitude and longitude. The physical distances may be calculated by a method which converts the coordinates into rectangular coordinates on a plane surface and calculate the distance or a method which directly calculates the distance using a formula (e.g. Hubeny formula). In this invention, any appropriate methods may be used to calculate the physical distance between two points. In this example, the distances between the communication terminal 110 and the information processing devices 112 and 118 are determined as follows:

0 m for the distance between the communication terminal 110 and the information processing device 112, and 7 m for the distance between the communication terminal 110 and the information processing device 118.

In Step S1720, the configuration information transmitting unit 734 transmits the configuration information about the information processing devices determined by the device determining unit 728 to the communication terminal 110. The configuration information is stored the configuration information table (FIG. 12) of the configuration information storage unit 736 in advance. Also, the configuration information transmitting unit 734 transmits the distances calculated in Step S1718 which are associated with the configuration information of the information processing devices to the communication terminal 110. In this example, the configuration information transmitting unit 734 transmits the following information: about the information processing device 112 having the identification information "#002" and the information processing device 118 having the identification information "#005":

connection information "fcmfp01.company.com", driver information "mono_printer.exe", functional setting information "mono_printer_config2.rst", and distance information "0 m" for the information processing device 112, and connection information "mprint01.company.com", driver information "color_mfp.exe", functional setting information "color_mfp_config1.rst", and distance information "7 m" for the information processing device 118. The configuration information receiving unit 740 of the communication terminal 110 receives the transmitted information.

In Step S1722, the configuration unit 742 of the communication terminal 110 configures the communication terminal 110 using the received information according to Step S1420 shown in FIG. 14 as stated above. Here, the configuration unit 742 may choose and resister the closest information processing device 112 of the information processing devices which may print a document as a default printer to the system.

In Step S1730, responding to user's instruction, the communication terminal 110 allows the closest information processing device 112 to perform the image output processing.

As stated above, the communication terminal 110 may choose one of the information processing devices performing the image output processing based on the configuration information and the distance information received from the information providing device 100 according to this embodiment. In particular, it improves user's convenience for communication terminal 110 to preferentially choose the closest information processing device 112 for the image output processing.

(4.3.3 Third Example)

Next, an example for setting condition about distances between communication terminal 110 and the information processing devices as the output condition specified by the user is explained with reference to FIGS. 20 and 21.

Figure 20:
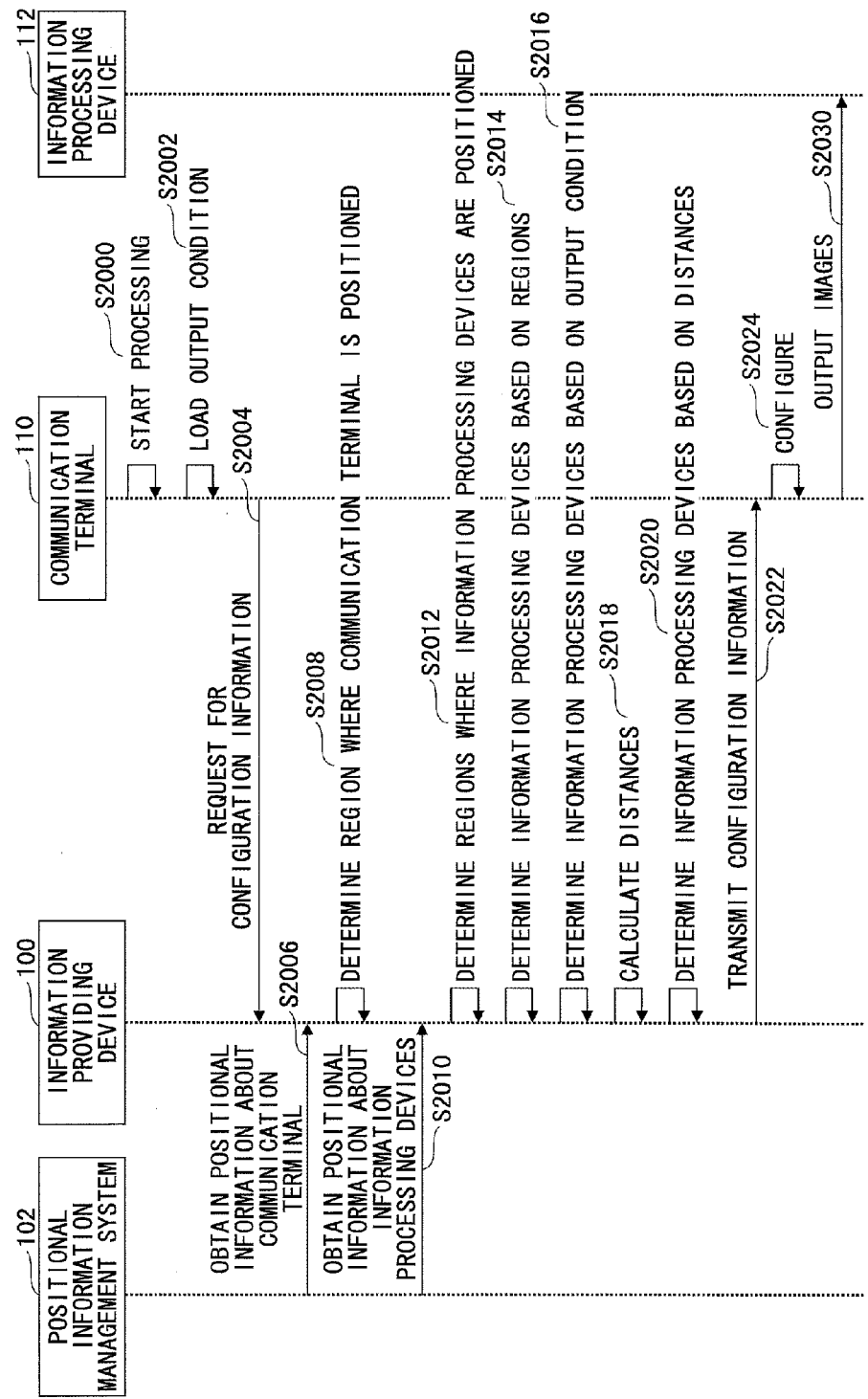
FIG. 20 is a sequence chart illustrating a third exemplary process of providing configuration information performed by an information providing system according to an embodiment.

FIG. 20 shows a sequence of the process performed by the devices included in the information providing system 1 which corresponds to the sequence shown in FIG. 17 described in "4.3.2 Second Example" section. Also, FIG. 21 shows a flowchart illustrating the process which is used instead of the process shown in FIG. 19 described in second example. The information providing device 100 operates according to the flowcharts shown in FIGS. 15, 18, and 21. The following explanation is made by focusing on the differences of the process described in the second example.

First, the process of the information providing device 110 in this example is explained with reference to FIGS. 15, 18, and 21.

The information providing device 110 in this example operates according to Steps S1500-S1524 shown in FIG. 15 and Steps S1800-S1814 shown in FIG. 18. The process of the steps is descried above. Here, the following output condition is set by the user:

(1) Paper Size (A4, A3, B4, B5, etc.),
(2) Print Colors (Black and white, Color etc.),
(3) Display resolution (800×600, 1024×768, 1280×1024 etc.),
(4) Display colors (8 bits, 16 bits, 32 bits), and
(5) Distance (within 5 m, within 10 m, within 15 m, etc.).
Here, a new condition about distance (5) is added.

Figure 21:
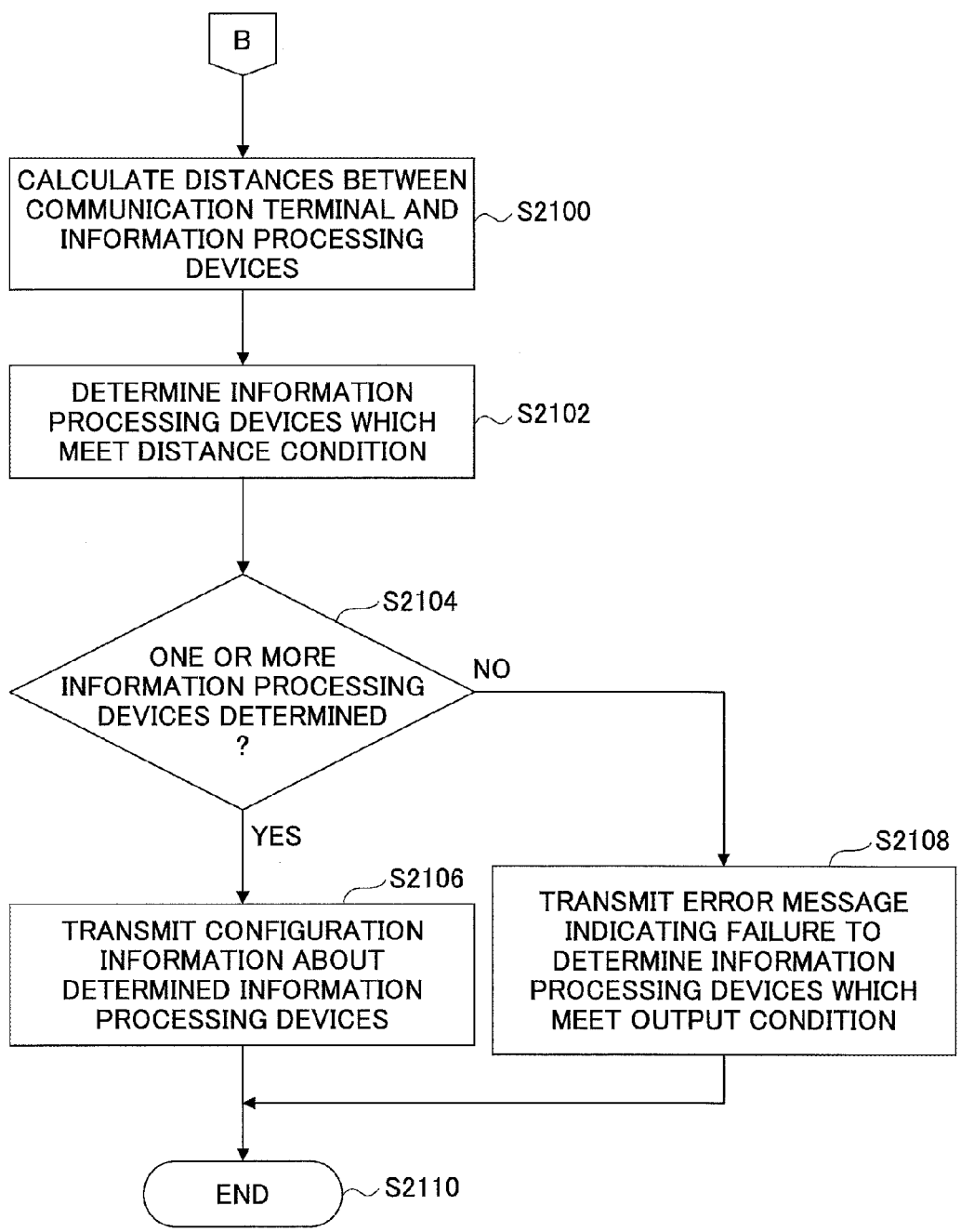
FIG. 21 is a flowchart illustrating a process performed by an information providing device according to an embodiment.

Step S2100 shown in FIG. 21 corresponds to Step S1818 shown in FIG. 19.

In Step S2102, the device determining unit 728 further determines one or more of the information processing devices determined in Step S1808 which meet the condition of distance in the output condition In Step S2104, whether one or more information processing devices determined in Step S2102 exist or not is determined. When one or more information processing devices exist (YES in Step S2104), the process proceeds to Step S2106. When one or more information processing devices do not exist (NO in Step S2104), the process proceeds to Step S2108.

In Step S2106, the configuration information transmitting unit 734 transmits the configuration information about the information processing devices determined in Step S2102 to the communication terminal 110.

In Step S2108, the configuration information transmitting unit 734 generates an error message indicating that no information processing device meeting the output condition exists in the region where the communication terminal 110 is positioned, and transmits the error message to the communication terminal 110. The display unit of the communication terminal 110 may display the error message.

In Step S2110, the process ends.

Next, the process of the information providing system 1 including the information providing device 100 which operates as stated above is explained with reference to FIG. 20. The configurations of the communication terminal 110, the information processing devices 112-118, and the information providing device 100 are shown in FIG. 1. In this example, the output condition has been determined by the user as follows:

(1) "any" for Paper Size,
(2) "any" for Print Colors,
(3) "1600×1200" for Display resolution,
(4) "32 bit" for Display colors, and
(5) "within 5 m" for Distance.

Steps S2000-S2018 correspond to Steps S1700-S1718 shown in FIG. 17 respectively. As stated above, the condition about distance is added to the output condition in this example. In this example, the information processing device 112 and the information processing device 118 are determined according to the output condition in Step S2016. In addition, the distances between the communication terminal 110 and the information processing devices 112 and 118 are calculated as follows:

0 m for the distance between the communication terminal 110 and the information processing device 112, and
7 m for the distance between the communication terminal 110 and the information processing device 118.

In Step S2020, the device determining unit 728 determines one or more information processing devices which meet the condition about distance included in the output condition received from the communication terminal 110. In this example, the condition about distance (5) is "within 5 m". Thus, the device determining unit 728 determines the information processing device 112.

In Step S2022, the configuration information transmitting unit 734 transmits the configuration information about the information processing devices determined in Step S2020 to the communication terminal 110. In this example, the configuration information transmitting unit 734 transmits the following configuration information: connection information "fcmfp01.company.com", driver information "mono_printer.exe", functional setting information "mono_printer_config2.rst", and distance information "0 m". The distance information may be omitted.

In Step S2024, the configuration unit 742 of the communication terminal 110 configures the communication terminal 110 using the received information according to Step S1420 shown in FIG. 14 as stated above.

In Step S2030, responding to user's instruction, the communication terminal 110 allows the information processing device 112 meeting the output condition to perform the image output processing.

As stated above, the information providing device 100 may transmit the configuration information about the information processing devices which meet the output condition including the condition about distance specified by the user to the communication terminal 110. This allows the communication terminal 110 to direct the information processing device located within a predetermined distance specified by the user to perform the image output processing.

What is claimed is:

1. An information providing device configured to communicate with a communication terminal and a plurality of information processing devices, the plurality of information processing devices each configured to perform information processing on data received from the communication terminal, the information providing device comprising:
   a memory and a processor, the memory containing computer readable instructions that, when executed by the processor, configure the processor to,
      obtain first positional information associated with the communication terminal via a database configured to manage the first positional information and an identification information associated with the communication terminal,
      determine which of the plurality of information processing devices is a selected information processing device based on the first positional information by,
         receiving output conditions from the communication terminal, the output conditions including requirements specified by a user of the communication terminal for the information processing of the data,
         determining which of the plurality of information processing devices are candidate information processing devices having functional setting information that satisfies the output conditions,
         obtaining second positional information associated with the candidate information processing devices, and
         selecting one of the candidate information processing devices as the selected information processing device based on the first positional information of the communication terminal and the second positional information of the candidate information processing devices, and
      transmit to the communication terminal, configuration information associated with the selected information processing device, the configuration information configuring the communication terminal to enable the communication terminal to transmit the data to the selected information processing device to perform the information processing, the configuration information including at least connection information for the selected information processing device.

2. The information providing device of claim 1, wherein the processor is configured to determine which of the plurality of information processing devices is in a same region as the communication terminal based on the first positional information.

3. The information providing device of claim 2, wherein the plurality of information processing devices are image forming devices configured to receive a request, from the communication terminal, to execute image output processing on the data, and
the processor is configured to transmit, to the communication terminal, the configuration information required for the communication terminal to transmit the request to the image forming devices.

4. The information providing device of claim 1, wherein the output condition is associated with a function of the plurality of information processing devices and/or a distance from the communication terminal to the plurality of information processing devices.

5. The information providing device of claim 1, wherein the configuration information further includes one or more of driver information about the information processing device, and the functional setting information about setting for a function of the information processing device.

6. The information providing device of claim 1, wherein the plurality of information processing devices are one or more of a printer, a projector or a display.

7. The information providing device of claim 1, wherein the processor is configured to obtain the first positional information from the communication terminal via a broadcasting device installed in a region.

8. The information providing device of claim 7, wherein the first positional information includes same positional information as a positioning signal transmitted by the broadcasting device.

9. The information providing device of claim 8, wherein the first positioning signal is formed according to IMES standard.

10. The information providing device of claim 1, wherein the processor is configured to transmit an error message to the communication terminal, if the processor determines that none of the plurality of information processing devices are associated with the first positional information of the communication terminal.

11. The information providing device of claim 1, wherein the configuration information enables the communication terminal to configure the communication terminal to directly transmit the data to the information processing device to perform the information processing.

12. The information providing device of claim 1, wherein the information providing device obtains the first positional information from the database which receives the first positional information from the communication terminal based on which of a plurality of broadcasting devices installed in an area containing the plurality of information processing devices broadcasts within a range of the communication terminal.

13. An information providing method performed by an information providing device which communicates with a communication terminal and a plurality of information processing devices, the plurality of information processing devices each configured to perform information processing on data received from the communication terminal, the method comprising:
   obtaining first positional information associated with the communication terminal via a database configured to manage the first positional information and an identification information associated with the communication terminal;
   determining which of the plurality of information processing devices is a selected information processing device based on the first positional information by,
      receiving output conditions from the communication terminal, the output conditions including requirements specified by a user of the communication terminal for the information processing of the data,
      determining which of the plurality of information processing devices are candidate information processing devices having functional setting information that satisfies the output conditions, obtaining second positional information associated with the candidate information processing devices, and selecting one of the candidate information processing devices as the selected information processing device based on the first positional information of the communication terminal and the second positional information of the candidate information processing devices; and transmitting to the communication terminal, configuration information associated with the selected information processing device, the configuration information configuring the communication terminal to enable the communication terminal to transmit the data to the selected information processing device to perform the information processing, the configuration information including at least connection information for the selected information processing device.

14. The method of claim 13, further comprising:

transmitting an error message to the communication terminal, if the determining determines that none of the plurality of information processing devices are associated with the first positional information of the communication terminal.

15. An information providing system, comprising:

a communication terminal;

a plurality of information processing devices configured to receive an instruction from the communication terminal to perform information processing on data received from the communication terminal; and an information providing device includes a memory and a first processor, the memory containing computer readable instructions that, when executed by the first processor, configure the first processor to, obtain first positional information associated with the communication terminal via a database configured to manage the first positional information and an identification information associated with the communication terminal, determine which of the plurality of information processing devices is a selected information processing device based on the first positional information by, receiving output conditions from the communication terminal, the output conditions including requirements specified by a user of the communication terminal for the information processing of the data, determining which of the plurality of information processing devices are candidate information processing devices having functional setting information that satisfies the output conditions, obtaining second positional information associated with the candidate information processing devices, and selecting one of the candidate information processing devices as the selected information processing device based on the first positional information of the communication terminal and the second positional information of the candidate information processing devices, and transmit to the communication terminal, configuration information associated with the selected information processing device, the configuration information including at least connection information for the information processing device, wherein the communication terminal includes a second processor configured to set the output conditions thereof based on the configuration information such that the communication terminal transmits the data to the selected information processing device to perform the information processing.

16. The information providing system of claim 15, wherein the first processor is configured to transmit an error message to the communication terminal, if the first processor determines that none of the plurality of information processing devices are associated with the first positional information of the communication terminal.

* * * * *